US010602545B2

(12) United States Patent
Mallik et al.

(10) Patent No.: US 10,602,545 B2
(45) Date of Patent: Mar. 24, 2020

(54) COOPERATIVE HIDDEN NODE IDENTIFICATION AND MANAGEMENT

(71) Applicant: QUALCOMM Incorporated, San Diego, CA (US)

(72) Inventors: Siddhartha Mallik, San Diego, CA (US); Taesang Yoo, Riverside, CA (US); Anastasios Stamoulis, San Diego, CA (US); Jing Sun, San Diego, CA (US); Aleksandar Damnjanovic, Del Mar, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 102 days.

(21) Appl. No.: 15/591,475

(22) Filed: May 10, 2017

(65) Prior Publication Data

US 2018/0035462 A1 Feb. 1, 2018

Related U.S. Application Data

(60) Provisional application No. 62/366,719, filed on Jul. 26, 2016.

(51) Int. Cl.
H04W 74/08 (2009.01)
H04W 72/08 (2009.01)
(Continued)

(52) U.S. Cl.
CPC ....... H04W 74/0816 (2013.01); H04W 48/08 (2013.01); H04W 48/16 (2013.01);
(Continued)

(58) Field of Classification Search
None
See application file for complete search history.

(56) References Cited

U.S. PATENT DOCUMENTS 8,681,810 B2  3/2014 Nandagopalan et al.
2014/0169279 A1* 6/2014 Song .................... H04W 72/082
                                                    370/329
(Continued)

FOREIGN PATENT DOCUMENTS

WO  WO-2007121340 A1  10/2007

OTHER PUBLICATIONS

ISA/EP, International Search Report and Written Opinion of the International Searching Authority, Int'l Application No. PCT/US2017/043607, dated Oct. 23, 2017, European Patent Office, Rijswijk, NL, 18 pgs.

(Continued)

Primary Examiner — Anh Ngoc M Nguyen
(74) Attorney, Agent, or Firm — Holland & Hart LLP

(57) ABSTRACT

Methods, systems, and devices for wireless communication are described that provide for detection and management of hidden node interference. A user equipment (UE) may provide measurement reports to a serving transmitting device to help identify the hidden node interferer in response to detecting hidden node interference. The serving transmitting device may collaborate with one or more neighboring transmitting devices, such as other transmitting devices of an operator of a wireless communications system, to identify one or more of the neighboring transmitting devices that are within an energy detect or preamble detect radius of the hidden node. The serving transmitting device may coordinate with the neighboring transmitting device(s) to determine when the hidden node may transmit, to transmit coordinated preamble transmissions to prevent the hidden node from transmitting during a transmission, or to identify a modulation and coding scheme for the transmission.

29 Claims, 21 Drawing Sheets

(51) Int. Cl.
*H04W 48/08* (2009.01)
*H04W 48/16* (2009.01)
*H04W 74/00* (2009.01)
H04W 72/04 (2009.01)
H04W 84/12 (2009.01)

(52) U.S. Cl.
CPC ....... *H04W 72/082* (2013.01); *H04W 74/004* (2013.01); *H04W 74/006* (2013.01); H04W 72/042 (2013.01); H04W 72/0426 (2013.01); H04W 84/12 (2013.01)

(56) References Cited

U.S. PATENT DOCUMENTS

| | | | |
|---|---|---|---|
| 2016/0081106 A1 | 3/2016 | Zhou et al. | |
| 2016/0135189 A1* | 5/2016 | Chandrasekhar | ........................... H04W 72/0453 370/329 |
| 2017/0280480 A1* | 9/2017 | Wong | ................ H04W 74/0808 |

OTHER PUBLICATIONS

Shigeyasu et al., "A New Method for Improving MAC Level Broadcast Receive Ratio Using 2-Phase RTS/CTS Handshakes Sequence," 2009 International Conference on Network-Based Information Systems, Aug. 19, 2009, pp. 580-585, XP031578013, Institute of Electrical and Electronics Engineers.

* cited by examiner

COOPERATIVE HIDDEN NODE IDENTIFICATION AND MANAGEMENT

CROSS REFERENCES

The present Application for Patent claims priority to U.S. Provisional Patent Application No. 62/366,719 by Mallik, et al., entitled "Cooperative Hidden Node Identification and Management," filed Jul. 26, 2016, assigned to the assignee hereof.

BACKGROUND

The following relates generally to wireless communication, and more specifically to cooperative hidden node identification and management in a wireless communications system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, each of which may be otherwise known as user equipment (UE).

Some modes of communication may enable communication between an access point (e.g., a base station) and a UE in a shared radio frequency spectrum band, or in different radio frequency spectrum bands (e.g., in a licensed radio frequency spectrum band and a shared or unlicensed radio frequency spectrum band) of a wireless network. A carrier in a shared radio frequency spectrum band may be available for use by devices intermittently due to contention for access to carriers of the shared radio frequency spectrum band between devices, such as between Wi-Fi devices operating according to Institute of Electrical and Electronics Engineers (IEEE) 802.11 protocols.

When contending for access to a wireless channel using shared radio frequency spectrum, a transmitter may perform a listen-before-talk (LBT) procedure to confirm that another transmitter is not using the wireless channel. The LBT procedure may include, for example, measuring energy received on the wireless channel and determining that the channel is currently in use by another transmitter when the energy level exceeds a threshold value. In some systems, devices may transmit preambles that provide information on the transmission, such as a duration of time of the transmission, that other devices may use to schedule subsequent LBT procedures. If two transmitters are sufficiently distant from one another the transmitters may concurrently transmit, as neither of the devices may receive sufficient energy from the other device to exceed the threshold energy level for identifying the other transmitter. However, if such a transmitting device is transmitting to a receiver that is located between the concurrently transmitting devices, the receiver may receive enough energy from the other device to interfere with the reception. The transmitter causing such interference may be referred to as a hidden node.

SUMMARY

The described techniques relate to improved methods, systems, devices, or apparatuses that support cooperative hidden node identification and management. Generally, the described techniques provide for detection of hidden node interference, and providing measurement reports from a UE to a serving transmitting device (e.g., an access point (AP) such as a base station that is currently serving the UE). This may help identify the hidden node interferer in response to detecting hidden node interference. The serving transmitting device may collaborate with one or more neighboring transmitting devices, such as other transmitting devices of an operator of a wireless communications system, to identify one or more of the neighboring transmitting devices that are within an energy detect or preamble detect radius of the hidden node. The serving transmitting device may coordinate with the neighboring transmitting device(s) to determine when the hidden node may transmit, to transmit coordinated preamble transmissions to prevent the hidden node from transmitting during a transmission, or to identify a modulation and coding scheme for the transmission.

A method of wireless communication is described. The method may include receiving, at a first transmitting device, one or more parameters from a receiving device indicating that the first transmitting device is outside of a transmission observation range of a hidden node and that the receiving device is within the transmission observation range of the hidden node; detecting, at the first transmitting device, a presence of the hidden node based at least in part on the one or more parameters; identifying a neighboring transmitting device within the transmission observation range of the hidden node based at least in part on the one or more parameters; and coordinating with the neighboring transmitting device to schedule a first transmission from the first transmitting device to the receiving device.

An apparatus for wireless communication is described. The apparatus may include means for receiving, at a first transmitting device, one or more parameters from a receiving device indicating that the first transmitting device is outside of a transmission observation range of a hidden node and that the receiving device is within the transmission observation range of the hidden node, means for detecting, at the first transmitting device, a presence of the hidden node based at least in part on the one or more parameters, means for identifying a neighboring transmitting device within the transmission observation range of the hidden node based at least in part on the one or more parameters, and means for coordinating with the neighboring transmitting device to schedule a first transmission from the first transmitting device to the receiving device.

Another apparatus for wireless communication is described. The apparatus may include a processor, memory in electronic communication with the processor, and instructions stored in the memory. The instructions may be operable to cause the processor to receive, at a first transmitting device, one or more parameters from a receiving device indicating that the first transmitting device is outside of a transmission observation range of a hidden node and that the receiving device is within the transmission observation range of the hidden node; detect, at the first transmitting device, a presence of the hidden node based at least in part on the one or more parameters; identify a neighboring transmitting device within the transmission observation range of the hidden node based at least in part on the one or more parameters; and coordinate with the neighboring transmitting device to schedule a first transmission from the first transmitting device to the receiving device.

A non-transitory computer readable medium for wireless communication is described. The non-transitory computer-readable medium may include instructions operable to cause a processor to receive, at a first transmitting device, one or more parameters from a receiving device indicating that the first transmitting device is outside of a transmission observation range of a hidden node and that the receiving device is within the transmission observation range of the hidden node; detect, at the first transmitting device, a presence of the hidden node based at least in part on the one or more parameters; identify a neighboring transmitting device within the transmission observation range of the hidden node based at least in part on the one or more parameters; and coordinate with the neighboring transmitting device to schedule a first transmission from the first transmitting device to the receiving device.

In some examples of the method, apparatus, and non-transitory computer-readable medium described above, coordinating with the neighboring transmitting device to schedule the first transmission from the first transmitting device to the receiving device may include identifying a resource allocation for the first transmission, providing the resource allocation to the neighboring transmitting device and an indication that the neighboring transmitting device is to transmit a preamble associated with the resource allocation, and transmitting, from the first transmitting device, the first transmission using wireless resources identified in the resource allocation. In some examples, the neighboring transmitting device and the first transmitting device each transmit a same preamble associated with the resource allocation. In some examples, the preamble transmitted by the neighboring transmitting device may operate to prevent the hidden node from transmitting during the first transmission. The preamble may include, for example, a ready to send (RTS) transmission that includes a transmitter identification, and the first transmitting device and the neighboring transmitting device may use a same transmitter identification. In some examples of the method, apparatus, and non-transitory computer-readable medium described above, the first transmitting device transmits a first transmitter identification, the neighboring transmitting device transmits a second transmitter identification, and the first transmitting device configures the receiving device to disregard the RTS transmission with the second transmitter identification.

In some examples of the method, apparatus, and non-transitory computer-readable medium described above, coordinating with the neighboring transmitting device to schedule the first transmission from the first transmitting device to the receiving device may include defining a cross-operator reservation signal to prevent transmissions from the hidden node during the first transmission, indicating to the neighboring transmitting device when the cross-operator reservation signal is to be transmitted, and transmitting the cross-operator reservation signal and the first transmission. In some examples of the method, apparatus, and non-transitory computer-readable medium described above, the first transmitting device and the neighboring transmitting device may be each devices of the same operator, and the cross-operator reservation signal may be ignored by devices of the same operator.

In some examples of the method, apparatus, and non-transitory computer-readable medium described above, coordinating with the neighboring transmitting device to schedule the first transmission from the first transmitting device to the receiving device may include querying the neighboring transmitting device to determine whether the hidden node will transmit during the first transmission, scheduling the first transmission irrespective of transmissions of the hidden node when the hidden node will not transmit during the first transmission, and accounting for a transmission from the hidden node when the hidden node will transmit during the first transmission. In some examples of the method, apparatus, and non-transitory computer-readable medium described above, the accounting for the transmission from the hidden node may include selecting a modulation and coding scheme (MCS) for the first transmission based at least in part on interference from the hidden node, selecting a wireless channel for the first transmission that may be not subject to interference from the hidden node, or any combination thereof.

In some examples of the method, apparatus, and non-transitory computer-readable medium described above, a transmission observation range of the hidden node comprises an energy detection range or a preamble detection range of the hidden node.

In some examples of the method, apparatus, and non-transitory computer-readable medium described above, the one or more parameters may include an identification of the hidden node, a time stamp indicating a start time of a transmission of the hidden node, a list of identifications of potential hidden nodes, of any combination thereof. In some examples of the method, apparatus, and non-transitory computer-readable medium described above, the presence of the hidden node may be detected by determining, based at least in part on the one or more parameters, that the receiving device may receive interference from the hidden node.

Some examples of the method, apparatus, and non-transitory computer-readable medium described above the one or more parameters may include acknowledgment feedback from the receiving device for one or more previous transmissions from the first transmitting to the receiving device, and the presence of the hidden node may be detected based at least in part on an amount of negative acknowledgment feedback exceeding a threshold. In some examples, the threshold may be based at least in part on one or more of a channel state information (CSI) report from the receiving device, a reference signal received power (RSRP) report from the receiving device, or an MCS used for the one or more previous transmissions.

In some examples of the method, apparatus, and non-transitory computer-readable medium described above, the identifying the neighboring transmitting device within the transmission observation range of the hidden node may include determining an identification of the hidden node, providing the identification of the hidden node to the neighboring transmitting device, and receiving an indication from the neighboring transmitting device that the neighboring transmitting device may be within the transmission observation range of the hidden node.

In some examples of the method, apparatus, and non-transitory computer-readable medium described above, the identifying the neighboring transmitting device within the transmission observation range of the hidden node may include providing information associated with the one or more parameters to the neighboring transmitting device, and receiving an indication from the neighboring transmitting device that the neighboring transmitting device may be within the transmission observation range of the hidden node based at least in part on the information associated with the one or more parameters. In some examples, the information associated with the one or more parameters may include a time stamp indicating a start time of a transmission of the hidden node.

Another method of wireless communication is described. The method may include receiving, at a second transmitting device, an indication from a first transmitting device that the first transmitting device is outside of a transmission observation range of a hidden node that is causing interference with transmissions from the first transmitting device to a receiving device, identifying that the second transmitting device is within the transmission observation range of the hidden node, and coordinating with the first transmitting device to schedule a first transmission from the first transmitting device to the receiving device.

An apparatus for wireless communication is described. The apparatus may include means for receiving, at a second transmitting device, an indication from a first transmitting device that the first transmitting device is outside of a transmission observation range of a hidden node that is causing interference with transmissions from the first transmitting device to a receiving device, means for identifying that the second transmitting device is within the transmission observation range of the hidden node, and means for coordinating with the first transmitting device to schedule a first transmission from the first transmitting device to the receiving device.

Another apparatus for wireless communication is described. The apparatus may include a processor, memory in electronic communication with the processor, and instructions stored in the memory. The instructions may be operable to cause the processor to receive, at a second transmitting device, an indication from a first transmitting device that the first transmitting device is outside of a transmission observation range of a hidden node that is causing interference with transmissions from the first transmitting device to a receiving device, identify that the second transmitting device is within the transmission observation range of the hidden node, and coordinate with the first transmitting device to schedule a first transmission from the first transmitting device to the receiving device.

A non-transitory computer readable medium for wireless communication is described. The non-transitory computer-readable medium may include instructions operable to cause a processor to receive, at a second transmitting device, an indication from a first transmitting device that the first transmitting device is outside of a transmission observation range of a hidden node that is causing interference with transmissions from the first transmitting device to a receiving device, identify that the second transmitting device is within the transmission observation range of the hidden node, and coordinate with the first transmitting device to schedule a first transmission from the first transmitting device to the receiving device.

In some examples of the method, apparatus, and non-transitory computer-readable medium described above, the coordinating with the first transmitting device may include receiving a resource allocation for the first transmission from the first transmitting device, and transmitting a preamble associated with the resource allocation. In some examples, the preamble may be a same preamble that may be transmitted by the first transmitting device. In some examples, the preamble comprises a RTS transmission that includes a transmitter identification. In some examples, the transmitter identification may be associated with the second transmitting device and may be different than an identification transmitted by the first transmitting device.

In some examples of the method, apparatus, and non-transitory computer-readable medium described above, coordinating with the first transmitting device may include receiving a query, from the first transmitting device, to determine whether the hidden node will transmit during the first transmission, determining whether a preamble from the hidden node has been received that indicates the hidden node will transmit during the first transmission, responding to the first transmitting device that the hidden node will transmit during the first transmission when the preamble from the hidden node indicates an overlap between a hidden node transmission and the first transmission, and responding to the first transmitting device that the hidden node will not transmit during the first transmission when the preamble from the hidden node may be not received or the preamble from the hidden node indicates no overlap between the hidden node transmission and the first transmission.

In some examples of the method, apparatus, and non-transitory computer-readable medium described above, identifying that the second transmitting device may be within the transmission observation range of the hidden node may include receiving one or more parameters associated with the hidden node from the first transmitting device, correlating the one or more parameters with receptions from one or more nodes received at the second transmitting device, and identifying the hidden node from the one or more nodes based at least in part on the correlating.

Another method of wireless communication is described. The method may include receiving, at a first receiving device, a first transmission from a first transmitting device; receiving, at the first receiving device, interference with the first transmission from an interfering transmitting device; identifying that the first transmitting device is outside of a transmission observation range of the interfering transmitting device; transmitting one or more parameters associated with the interfering transmitting device to the first transmitting device; and receiving, from a second transmitting device, a preamble associated with a second transmission from the first transmitting device.

An apparatus for wireless communication is described. The apparatus may include means for receiving, at a first receiving device, a first transmission from a first transmitting device, means for receiving, at the first receiving device, interference with the first transmission from an interfering transmitting device, means for identifying that the first transmitting device is outside of a transmission observation range of the interfering transmitting device, means for transmitting one or more parameters associated with the interfering transmitting device to the first transmitting device, and means for receiving, from a second transmitting device, a preamble associated with a second transmission from the first transmitting device.

Another apparatus for wireless communication is described. The apparatus may include a processor, memory in electronic communication with the processor, and instructions stored in the memory. The instructions may be operable to cause the processor to receive, at a first receiving device, a first transmission from a first transmitting device; receive, at the first receiving device, interference with the first transmission from an interfering transmitting device; identify that the first transmitting device is outside of a transmission observation range of the interfering transmitting device; transmit one or more parameters associated with the interfering transmitting device to the first transmitting device; and receive, from a second transmitting device, a preamble associated with a second transmission from the first transmitting device.

A non-transitory computer readable medium for wireless communication is described. The non-transitory computer-readable medium may include instructions operable to cause a processor to receive, at a first receiving device, a first transmission from a first transmitting device; receive, at the first receiving device, interference with the first transmission from an interfering transmitting device; identify that the first transmitting device is outside of a transmission observation range of the interfering transmitting device; transmit one or more parameters associated with the interfering transmitting device to the first transmitting device; and receive, from a second transmitting device, a preamble associated with a second transmission from the first transmitting device.

In some examples of the method, apparatus, and non-transitory computer-readable medium described above, the preamble associated with the second transmission may be received from both the first transmitting device and the second transmitting device. Some examples of the method, apparatus, and non-transitory computer-readable medium described above may further include processes, features, means, or instructions for ignoring the preamble from the second transmitting device.

In some examples of the method, apparatus, and non-transitory computer-readable medium described above, the one or more parameters associated with the interfering transmitting device may include one or more of an identification of the interfering transmitting device, a start time of the interference with the first transmission, or an indication that one or more portions of the first transmission may be not successfully received.

In some examples of the method, apparatus, and non-transitory computer-readable medium described above, the first transmitting device may be identified as outside of the transmission observation range of the interfering transmitting device based at least in part on detecting a preamble associated with the interference from the interfering transmitting device, and determining that a transmission duration identified in the preamble overlaps resources allocated for the first transmission. In some examples of the method, apparatus, and non-transitory computer-readable medium described above, the first transmitting device may be identified as outside of the transmission observation range of the interfering transmitting device based at least in part on detecting an increase in received power from the interfering transmitting device before or during the first transmission. In some examples of the method, apparatus, and non-transitory computer-readable medium described above, the one or more parameters associated with the interfering transmitting device may include a start time of the increase in received power.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Additionally or alternatively, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
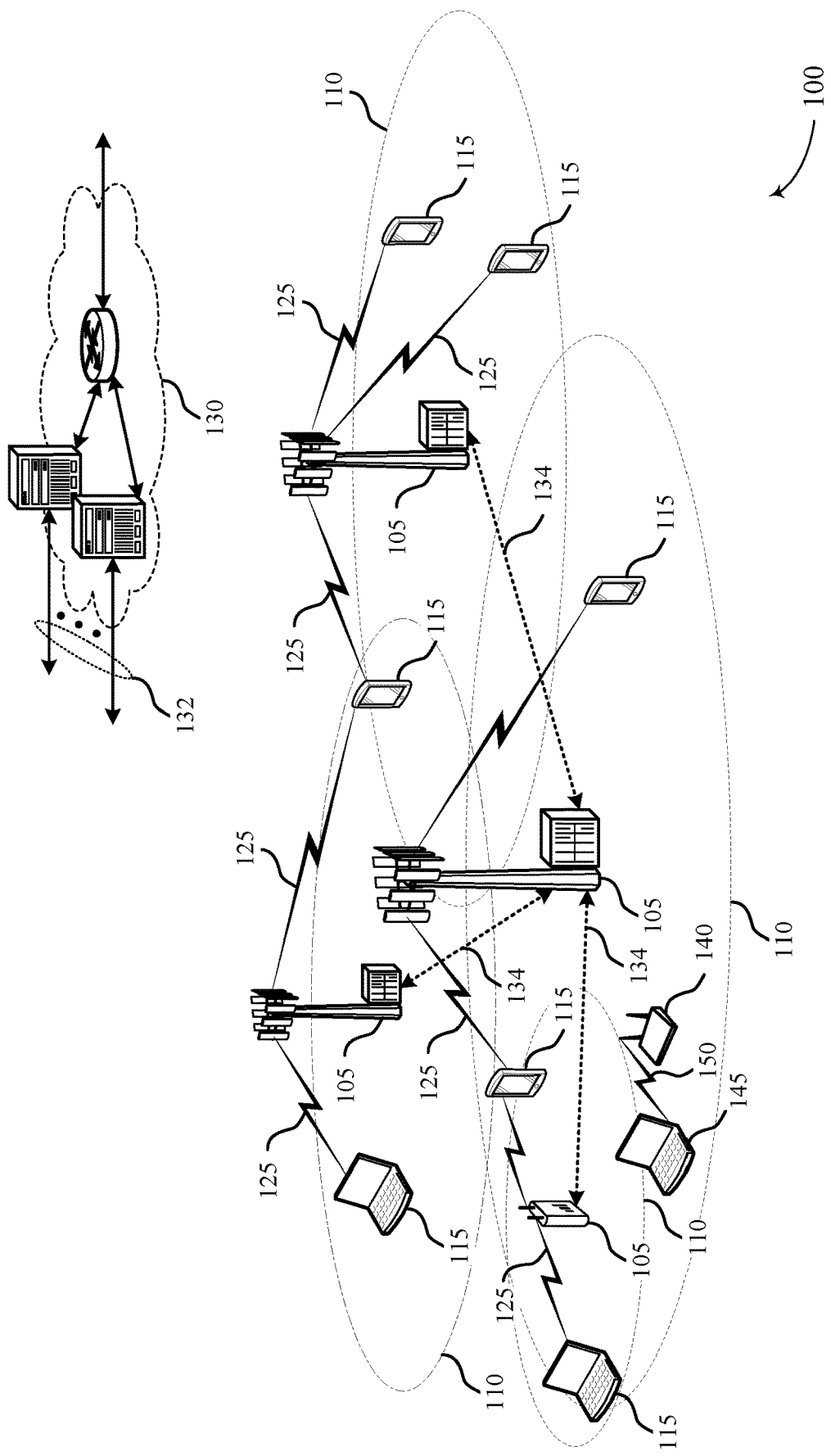
FIG. 1 illustrates an example of a system for wireless communication that supports cooperative hidden node identification and management in accordance with various aspects of the present disclosure.

The present disclosure provides techniques for detection of hidden node interference. These techniques may facilitate collaboration between a serving transmitting device and neighboring transmitting devices to make scheduling decisions, MCS selection strategies, coordinated preamble transmissions, or combinations thereof, to address hidden node interference. Hidden node interference may occur, as indicated above, when a serving transmitting device (e.g., an AP serving a UE) lies outside of an energy detect (ED) or preamble detect (PD) radius of a second transmitting node and is serving a UE that lies within the ED or PD radius of the second transmitting node. In such cases, the serving transmitting device may not detect a transmission of the second transmitting node and may thus transmit concurrently with the second transmitting node, which may result in interference at the UE. The second transmitting node may be referred to as a hidden node due to its transmissions not being detected at the serving transmitting device but nonetheless causing interference at the receiving UE.

In some examples, in the event that a serving transmitting device is serving a receiving UE that is subject to interference from a hidden node, the UE may provide measurement reports to the serving transmitting device (e.g., a serving base station or AP) to help identify the hidden node interferer in response to detecting hidden node interference. The serving transmitting device may collaborate with one or more neighboring transmitting devices, such as other transmitting devices of an operator of a wireless communications system, to identify one or more of the neighboring transmitting devices that are within an ED or PD radius of the hidden node. The serving transmitting device may coordinate with the neighboring transmitting device(s) to determine when the hidden node may transmit, to transmit coordinated preamble transmissions to prevent the hidden node from transmitting during a transmission, or to identify an MCS for the transmission.

In some examples, a serving transmitting device may coordinate with one or more neighboring transmitting device to transmit a preamble (or RTS transmission) for a transmission to the UE. The neighboring device may transmit a same or different preamble as the serving transmitting device, concurrently with the preamble transmission by the serving transmitting device. The hidden node may receive the preamble transmission of the neighboring transmitting device and not transmit, due to not having won channel contention for channel access. The UE may then receive the remainder of the transmission from the serving transmitting device without interference from the hidden node. In cases where the neighboring transmitting device transmits a different preamble than the serving transmitting device, the UE may recognize that the neighboring device preamble transmission was made for channel reservation purposes, and may disregard the preamble transmission from the neighboring transmitting device, and respond to the preamble of the serving transmitting device. In some examples, transmitting devices of an operator may define a special cross-operator reservation signal to silence nodes from other operators, and hence cause the hidden node to refrain from transmitting. Such a special cross-operator reservation signal may be ignored among transmitting devices of a same operator.

In some examples, a serving transmitting device may query an identified neighboring transmitting device to determine if the hidden node has transmitted a preamble that indicates a subsequent transmission of the hidden node that may interfere with a transmission of the serving transmitting device. If the neighboring transmitting device indicates that there may be hidden node interference, the serving transmitting device may adjust a scheduling of the transmission to avoid the interfering transmission from the hidden node, may move the UE a to another wireless channel (if available), may select an MCS for the transmission based on the presence of hidden node interference, or any combination thereof.

As indicated above, in some cases a serving transmitting device may identify one or more neighboring transmitting devices and coordinate with the one or more neighboring transmitting devices for a subsequent transmission to the receiving UE. In some cases, a serving transmitting device may identify the one or more neighboring transmitting devices that can observe the hidden node as a device that can either detect preambles from the hidden node with a high probability, or that can detect energy from transmissions of the hidden node with a high probability without identifying the hidden node by information in transmitted preambles, such as through correlations of timestamps of increased received power at the UE that is matched to increases in received power at the identified neighboring transmitting device. In cases where correlations of timestamps of increased power are matched, this correlation may be noisy and multiple timestamps may be used to identify an observer neighboring transmitting device with high confidence. In some cases, a UE may transmit timestamps associated with an increase in received power. Additionally or alternatively, a serving base station may identify times associated with a hidden node transmission based on an increased rate of negative acknowledgments (NACKs) received from the UE.

Aspects of the disclosure are initially described in the context of a wireless communications system and process flows for hidden node identification and management. Aspects of the disclosure are further illustrated by and described with reference to apparatus diagrams, system diagrams, and flowcharts that relate to cooperative hidden node identification and management.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced (LTE-A)) network that provides for detection of hidden node interference, and collaboration between multiple transmitting devices to make coordinated preamble transmissions, scheduling decisions, MCS selection strategies, or combinations thereof, to a UE that may be subject to hidden node interference.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may additionally or alternatively be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally or alternatively be referred to as eNodeBs (eNBs) or gnodeBs (gNBs) 105.

In some cases wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may additionally or alternatively be configured for use in unlicensed spectrum or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power). A 5G or new radio (NR) carrier may, in some examples, be an eCC.

As indicated above, in some examples UEs 115 and base stations 105 may use shared radio frequency spectrum for all or a portion of communications (e.g., using eCCs), and may contend for access to the shared radio frequency spectrum with other transmitters that may use different radio access technology (e.g., Wi-Fi transmitters) or transmitters of other operators of other wireless communications systems. In the example of FIG. 1, a Wi-Fi AP 140 may communicate with a Wi-Fi receiver 145 via a Wi-Fi link 150. As indicated above, in some cases the Wi-Fi AP 140 or Wi-Fi receiver 145 may be a hidden node interferer with one or more base stations 105 or UEs 115 that use shared radio frequency spectrum for all or a portion of their communications. Various aspects of the present disclosure provide techniques for detection of hidden node interference, and collaboration between multiple base stations 105 for management of hidden node interference.

Figure 2:
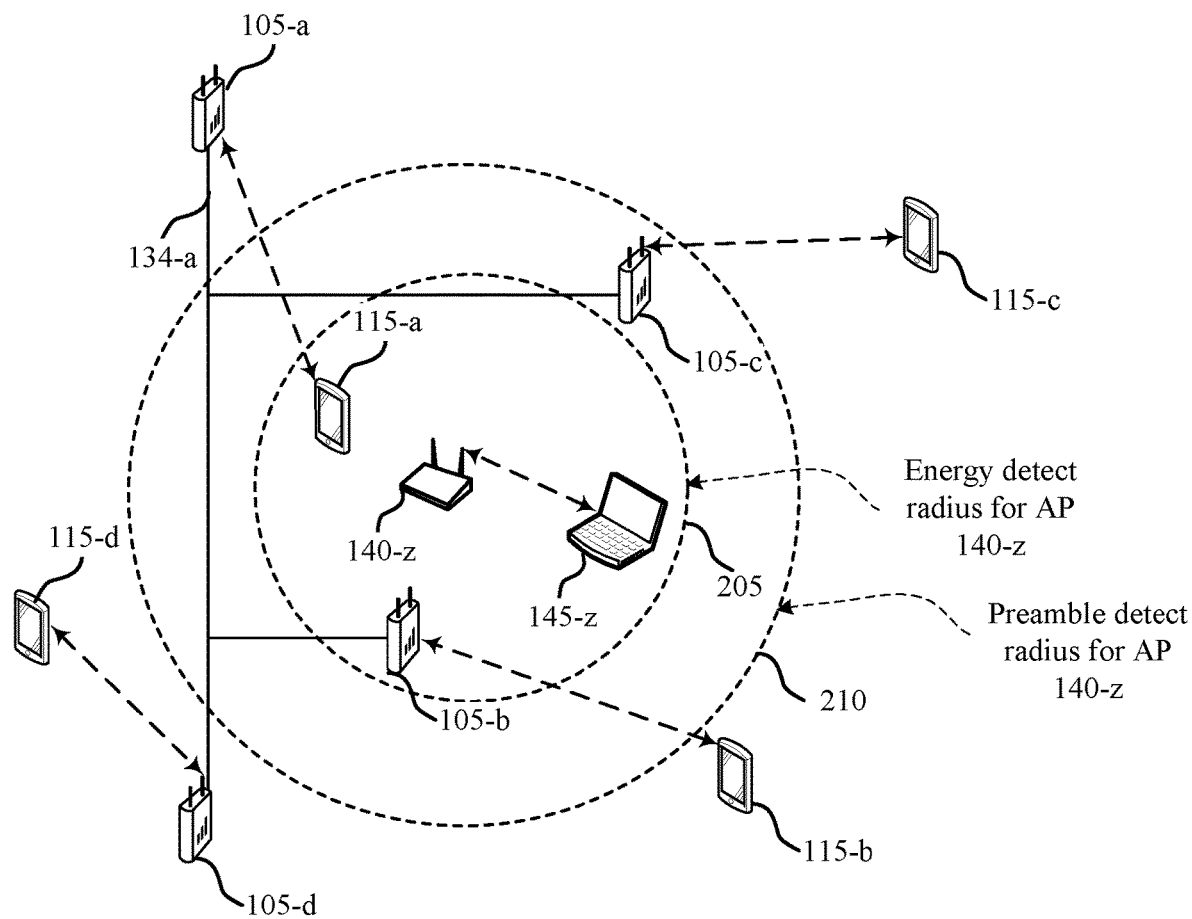
FIG. 2 illustrates an example of a wireless communications system that supports cooperative hidden node identification and management in accordance with various aspects of the present disclosure.

FIG. 2 illustrates an example of a wireless communications system 200 for cooperative hidden node identification and management in accordance with various aspects of the present disclosure. Wireless communications system 200 may include a first base station 105-a, a second base station 105-b, a third base station 105-c, and a fourth base station 105-d, which may be base stations 105 of a first wireless operator (e.g., a first public land mobile network (PLMN) operator). The first base station 105-a may communicate with a first UE 115-a, the second base station 105-b may communicate with second UE 115-b, the third base station 105-c may communicate with third UE 115-c, and the fourth base station 105-d may communicate with fourth UE 115-e. In this example wireless system, a hidden node interferer Wi-Fi AP 140-z may communicate with a Wi-Fi receiver 145-z, each of which may be associated with a second wireless operator. The base stations 105, UEs 115, Wi-Fi AP 140-z, and Wi-Fi receiver 145-z may be examples of the corresponding devices described with reference to FIG. 1. Base stations 105 and UEs 115 in some examples may be referred to as eCC or licensed assisted access (LAA) nodes. Base stations 105 may communicate with each other via backhaul links 134-a (e.g., X2, etc.).

In some examples of the wireless communications system 200, the base stations 105 and UEs 115 may transmit waveforms using one or more component carriers that may include OFDMA waveforms, SC-FDMA waveforms, or resource block interleaved FDMA waveforms, for example. The communications links may be associated with a frequency in the shared radio frequency spectrum band. This example is presented for illustrative purposes and there may be other similar modes of operation or deployment scenarios that provide LTE/LTE-A communication in a shared radio frequency spectrum band. In some examples, base stations 105 may be deployed in a residential, small business, medium business, or enterprise environment, and may allow UEs 115 to establish connections using shared radio frequency spectrum band(s). Such a deployment may allow UEs 115 to operate using shared radio frequency spectrum and reduce data usage provided through licensed or dedicated radio frequency spectrum bands, which may help reduce costs for users.

In the example of FIG. 2, hidden node Wi-Fi AP 140-z may have an ED radius 205, and a PD radius 210. First base station 105-a in this example is located outside of both the ED radius 205 and the PD radius 210, and therefore is not able to detect energy from hidden node Wi-Fi AP 140-z at a sufficient level to detect the presence of the hidden node Wi-Fi AP 140-z. However, the first UE 115-a is within the ED radius 205 and the PD radius 210, and thus if the hidden node Wi-Fi AP 140-z is transmitting concurrently with a transmission from the first base station 105-a to the first UE 115-a, the first UE 115-a may receive interference that may prevent successful reception and decoding of the transmission from the first base station 105-a.

In some examples, the first UE 115-a may identify that interference received from the hidden node Wi-Fi AP 140-z is hidden node interference, and may transmit one or more parameters to the first base station 105-a that may help the first base station 105-a to identify the hidden node interferer. The first base station 105-a may receive the one or more parameters and determine that hidden node Wi-Fi AP 140-z is a hidden node interferer. The first base station 105-a may then collaborate with second base station 105-b, third base station 105-c, and fourth base station 105-d to identify one or more neighboring base stations 105 that are within the ED radius 205 or PD radius 210 of the hidden node Wi-Fi AP 140-z. Following the identification of a neighboring base station within the ED radius 205 or PD radius 210, the first base station 105-a may make scheduling decisions, MCS selection strategy, coordinated transmissions with the identified base station, or any combination thereof for one or more subsequent transmissions to the first UE 115-a.

As indicated above, in some examples the detection of hidden node interference from hidden node Wi-Fi AP 140-z may be made at the first UE 115-a. For example, the first UE 115-a may detect a preamble from hidden node Wi-Fi AP 140-a that may help identify Wi-Fi AP 140-z as a potential dominant interferer. In some cases, the UE 115-a may transmit the identification from the preamble to the first base station 105-a. If the transmission duration indicated in the preamble from hidden node Wi-Fi AP 140-z overlaps with the transmission duration of the transmission from the first base station 105-a to the first UE 115-a, the first UE 115-a may determine that hidden node Wi-Fi AP 140-z is hidden from first base station 105-a. In some cases, the first UE 115-a may transmit the identification of Wi-Fi AP 140-z to the first base station 105-a as a parameter that may be provided to the first base station 105-a upon detection of hidden node interference.

If preamble detection of a preamble from hidden node Wi-Fi AP 140-z is not successful at the first UE 115-a, the first UE 115-a may apply an energy detection procedure to detect a strong increase in received power before or during its data reception from the first base station 105-a. A time stamp indicating a start, end, or both, of the strong increase in received power may be provided as one or more of the parameters that may be provided to the first base station 105-a upon detection of hidden node interference. In some examples, the first base station 105-a may additionally or alternatively identify likely presence of hidden node interference by comparing acknowledgment/negative-acknowledgment (ACK/NACK) reports sent by the first UE 115-a with the scheduled MCS, recent CSI from the first UE 115-a, recent RSRP reports from the first UE 115-a, or combinations thereof, with expected ACK/NACK rates. For example, if the first UE 115-a reports significantly more NACKs starting at a particular time than would be expected for a given MCS, CSI, or RSRP, the first base station 105-a may infer that hidden node interference is present.

As indicated above, in some cases, to aid hidden node identification at the serving first base station 105-a, a measurement report sent by the first UE 115-a may include one or more parameters, such as, for example, the ID of the hidden node Wi-Fi AP 140-z (e.g., inferred from the preamble of any transmission from the hidden node Wi-Fi AP 140-z), if identifiable by the first UE 115-a. Additionally or alternatively, if the identification of the hidden node Wi-Fi AP 140-z is not possible at the first UE 115-a, then a time stamp of when a sharp increase in received power was detected at the first UE 115-a may be provided, along with a list of potential hidden node interferers if available. Such a list of potential hidden node interferers may include, for example, a list of strong cells that were detected at the first UE 115-a in the recent past (e.g., within a time window of 1-10 seconds).

In response to identifying the presence of a hidden node interferer, the first base station 105-a may collaborate with second base station 105-b, third base station 105-c, and fourth base station 105-d to identify whether any of these neighboring base stations 105 can observe hidden node Wi-Fi AP 140-z. A candidate observer base station 105 may be, for example, a base station 105 that can detect preambles from hidden node Wi-Fi AP 140-z with a high probability, where the first UE 115-a was able to identify the hidden node Wi-Fi AP 140-z. A candidate observer base station 105 may additionally or alternatively be a base station 105 that can detect energy from transmissions of hidden node Wi-Fi AP 140-z with a high probability without identifying the hidden node interferer. Identifying such a candidate observer base station 105 may be accomplished, for example, by correlating one or more timestamps of increases in received power at the first UE 115-a (or associated time stamps of increased NACK rates) with increases in received power at the other base stations 105 to identify matching energy measurements. Such correlation may be noisy, and multiple timestamps may be necessary to identify an observing base station 105 with relatively high confidence. In the example of FIG. 2, second base station 105-b may be identified as an observer based on the location within the ED radius 205 allowing the second base station 105-b to reliably detect transmissions of the hidden node Wi-Fi AP 140-z. In some examples, third base station 105-c may additionally or alternatively be identified as an observer based on its ability to detect preamble transmissions of the hidden node Wi-Fi AP 140-z.

Once one or more observing base stations 105 are identified, the first base station 105-a may coordinate with the other neighboring base station(s) 105 for subsequent transmissions to the first UE 115-a. In some examples, the first base station 105-a may move the first UE 115-a a to another wireless channel without interference, if available. In some examples, the MCS selection at the first base station 105-a for a given TTI that may have hidden node interference may account for the interference to enhance the likelihood of successful reception at the first UE 115-a. In some cases, the first base station 105-a may send an inquiry to second base station 105-b to determine whether the second base station 105-b has received a preamble from the hidden node Wi-Fi AP 140-z that indicates the hidden node Wi-Fi AP 140-z will transmit during a particular time period. If the second base station 105-b responds to the inquiry indicating that the hidden node Wi-Fi AP 140-z will transmit, the first base station 105-b may, for example, alter the scheduling of the transmission to the first UE 115-a or may select an MCS to account for the potential interference. In some examples, the first UE 115-a may, as part of the parameters provided to the first base station, provide a received signal strength of the hidden node interferer that may be used for MCS selection by the first base station 105-a.

Additionally or alternatively, the first base station 105-a may coordinate transmission of a preamble from one or both of the second base station 105-b or third base station 105-c that is coordinated with a data transmission from the first base station 105-a to the first UE 115-a to prevent the hidden node Wi-Fi AP 140-z from initiating a transmission that overlaps with the transmission from the first base station 105-a. Such a coordinated preamble transmission may include, for example, multiple base stations 105 sending RTS simultaneously, with the one or more neighboring base stations 105 posing as the first base station 105-a by transmitting an identifier associated with the first base station 105-a. In other examples, each base station 105 may transmit a coordinated preamble with each base station 105 sending its own RTS addressed to the first UE 115-a, with the first UE 115-a only responding to the RTS from the first base station 105-a, understanding that the RTS from the other base station(s) is merely to prevent the hidden node Wi-Fi AP 140-z from transmitting. In some cases, the first base station 105-a may configure the first UE 115-a to ignore preamble transmissions from neighboring base stations 105 in such cases. In other examples, a special cross-operator reservation signal may be defined that may be used to silence nodes from other operators, such as hidden node Wi-Fi AP 140-z. This cross-operator reservation signal may be ignored among transmitters of a same operator. Coordination between base stations 105 may occur over backhaul links 134-a, in some examples. Additionally or alternatively, base stations 105 may coordinate using over the air transmissions. In some examples, base stations 105 may exchange information related to hidden node transmissions using predefined protocols and information elements that allow efficient identification and exchange of related information for hidden node interferers.

Figure 3:
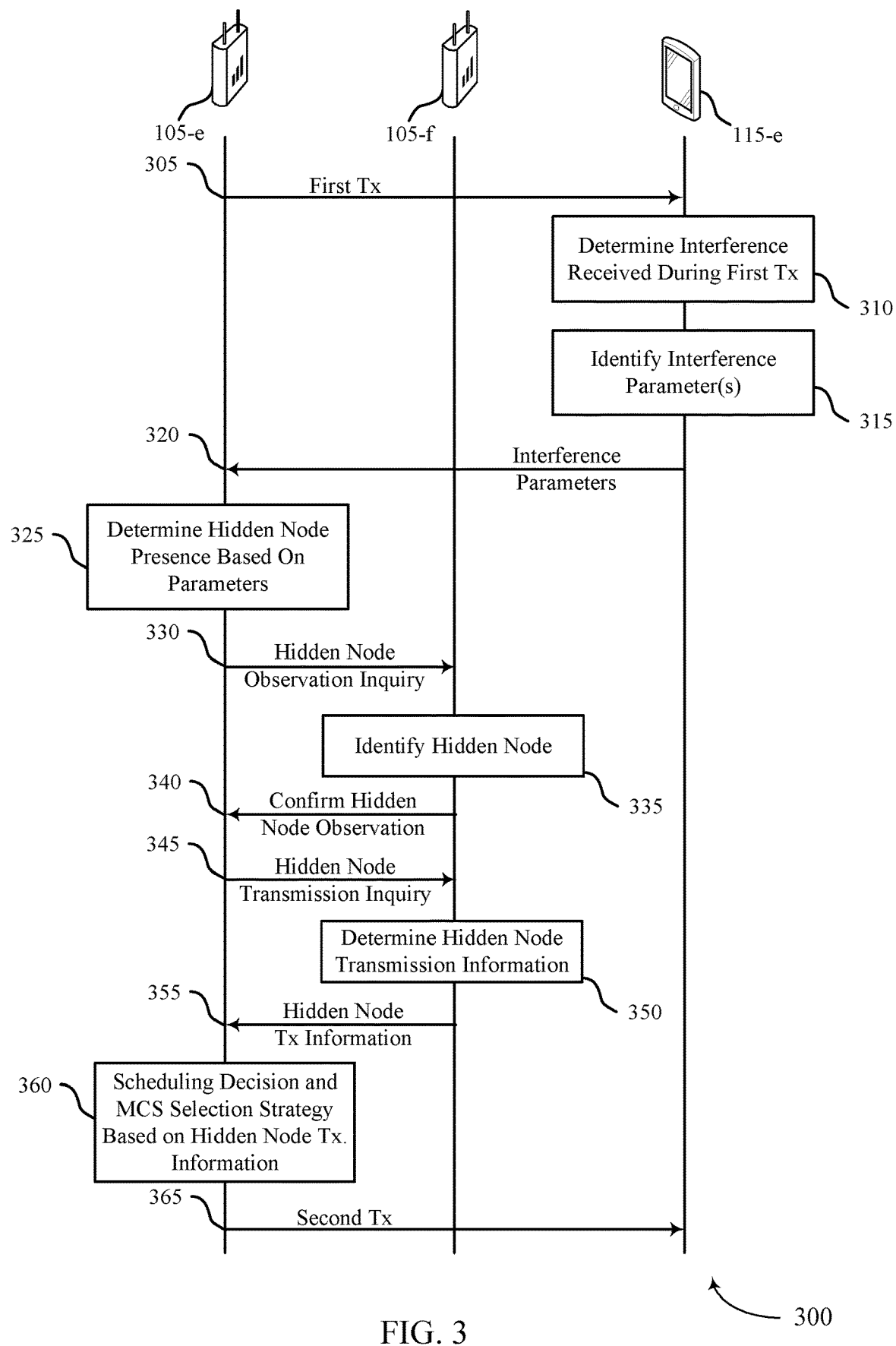
FIG. 3 illustrates an example of a process flow that supports cooperative hidden node identification and management in accordance with various aspects of the present disclosure.

FIG. 3 illustrates an example of a process flow 300 for cooperative hidden node identification and management in accordance with various aspects of the present disclosure. In some cases, process flow 300 may represent aspects of techniques performed by a UE 115 or base station 105 as described with reference to FIGS. 1-2. Process flow 300 of this example provides for identification of a hidden node interferer and coordination with neighboring base stations to account for hidden node interference.

In the example of FIG. 3, a first transmitting device 105-e, which may be an example of a base station 105 of FIGS. 1-2, may transmit a first transmission 305 to a first UE 115-e. The first UE 115-e may determine, at block 310, that interference is received during the first transmission 305. Such a determination may be made, as indicated above, by identifying an interfering transmission having a duration that overlaps with a transmission duration of first transmission 305, for example. The first UE 115-e may identify the interference as coming from a hidden node, and may identify one or more interference parameters, as indicated at block 315. Such interference parameters may include, for example, an identification of the hidden node, a received power of the interfering signal, a time stamp associated with the interfering signal, or any combination thereof. The first UE 115-*e* may transmit the interference parameters 320 back to the first transmitting device 105-*e*. The first transmitting device 105-*e* may, at block 325, determine the presence of a hidden node interferer based on the parameters. The first transmitting device 105-*e* may then transmit hidden node observation inquiry 330 to neighboring transmitting device 105-*f*, which may be an example of a neighboring base station 105 of FIGS. 1-2. As indicated above, the hidden node observation inquiry 330 may be transmitted using a backhaul link between the first transmitting device 105-*e* and neighboring transmitting device 105-*e*.

The neighboring transmitting device 105-*e* may, at block 335, identify the hidden node. The identification of the hidden node, as discussed above, may be made based on an identification of the hidden node, such as from a preamble transmitted by the hidden node, one or more time stamps associated with hidden node transmissions, or any combination thereof. The neighboring transmitting device 105-*f* may transmit a confirmation of hidden node observation 340 to the first transmitting device 105-*e*. The first transmitting device 105-*e* may then determine that a subsequent second transmission is to be transmitted to the first UE 115-*e*. Prior to transmitting the second transmission to the first UE 115-*e*, the first transmitting device 105-*e* may transmit hidden node transmission inquiry 345 to the neighboring transmitting device 105-*f*. The hidden node transmission inquiry 345 may include, for example, a resource allocation associated with the second transmission or a time period for the second transmission. The neighboring transmitting device 105-*f* may determine hidden node transmission information as indicated at block 350. In some examples, the neighboring transmitting device 105-*f* may determine if a preamble has been received from the hidden node that indicates the hidden node will transmit an overlapping transmission with the second transmission from the first transmitting device 105-*e*. The neighboring transmitting device 105-*f* may transmit hidden node transmission information 355 to the first transmitting device 105-*e*. The hidden node transmission information 355 may include, for example, an indication that the hidden node will or will not transmit during the second transmission.

The first transmitting device 105-*e* may, at block 360, make a scheduling decision and MCS selection based on the hidden node transmission information 355. In some examples, the first transmitting device 105-*e* may move the second transmission to a different wireless channel or adjust a resource allocation for the second transmission to avoid the transmission of the hidden node. In some examples, the first transmitting device 105-*e* may select an MCS based on the hidden node transmission information 355 that will increase the probability that the first UE 115-*e* will successfully receive the second transmission even in the presence of a transmission from the hidden node. The first transmitting device 105-*e* may then transmit second transmission 365 to the first UE 115-*e*.

Figure 4:
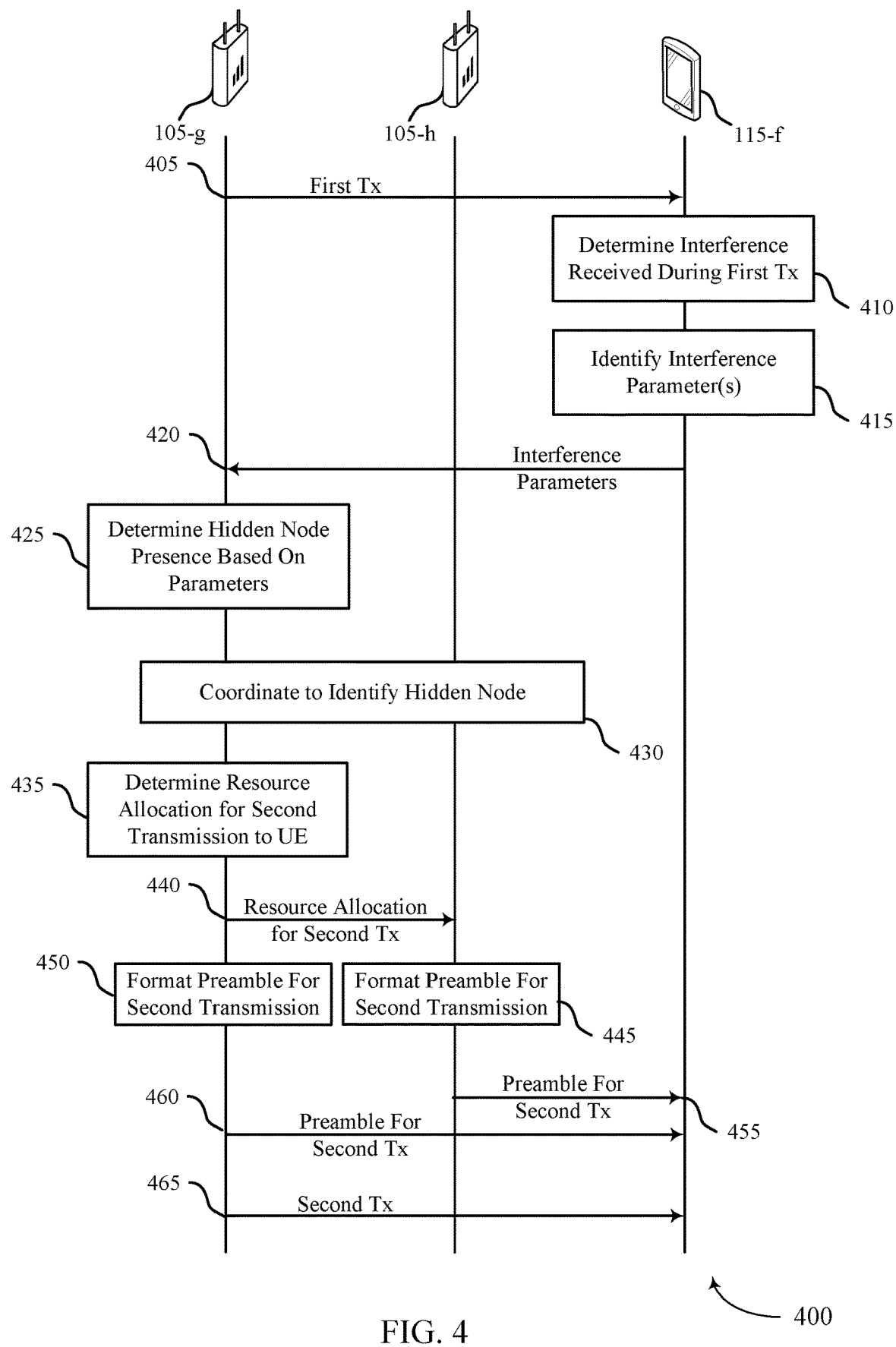
FIG. 4 illustrates an example of a process flow that supports cooperative hidden node identification and management in accordance with various aspects of the present disclosure.

FIG. 4 illustrates an example of a process flow 400 for cooperative hidden node identification and management in accordance with various aspects of the present disclosure. In some cases, process flow 400 may represent aspects of techniques performed by a UE 115 or base station 105 as described with reference to FIGS. 1-2. Process flow 400 of this example provides for identification of a hidden node interferer and coordination with neighboring base stations to account for hidden node interference.

In the example of FIG. 4, a first transmitting device 105-*g*, which may be an example of a base station 105 of FIGS. 1-2, may transmit a first transmission 405 to a first UE 115-*f*. The first UE 115-*f* may determine, at block 410, that interference is received during the first transmission 405. Such a determination may be made, as indicated above, by identifying an interfering transmission having a duration that overlaps with a transmission duration of first transmission 405, for example. The first UE 115-*f* may identify the interference as coming from a hidden node, and may identify one or more interference parameters, as indicated at block 415. Such interference parameters may include, for example, an identification of the hidden node, a received power of the interfering signal, a time stamp associated with the interfering signal, or any combination thereof. The first UE 115-*f* may transmit the interference parameters 420 back to the first transmitting device 105-*g*. The first transmitting device 105-*g* may, at block 425, determine the presence of a hidden node interferer based on the parameters.

The first transmitting device 105-*g* and the neighboring transmitting device 105-*h* may coordinate, at block 430, to identify the hidden node. Such coordination may include, for example, identification of the hidden node based on a preamble ID, or based on time stamps for increased energy from the hidden node, similarly as discussed above. At block 435, the first transmitting device 105-*g* may determine a resource allocation for a second transmission to the first UE 115-*f*. The first transmitting device 105-*g* may transmit the resource allocation for the second transmission 440 to the neighboring transmitting device 105-*h*. At block 445, the neighboring transmitting device 105-*h* may format a preamble for the second transmission, which may include an identification of the first transmitting device 105-*g* or an identification of the neighboring transmitting device 105-*h*, as discussed above. At block 450, the first transmitting device 105-*g* may format a preamble for the second transmission as well, as discussed above. The neighboring transmitting device 105-*h* may transmit the preamble 455 for the second transmission and the first transmitting device 105-*g* may transmit preamble 460 for the second transmission. Such preamble transmissions 455 and 460 may be coordinated so as to prevent the hidden node from transmitting during the second transmission 465 transmitted by the first transmitting device 105-*g* to the first UE 115-*f*.

Figure 5:
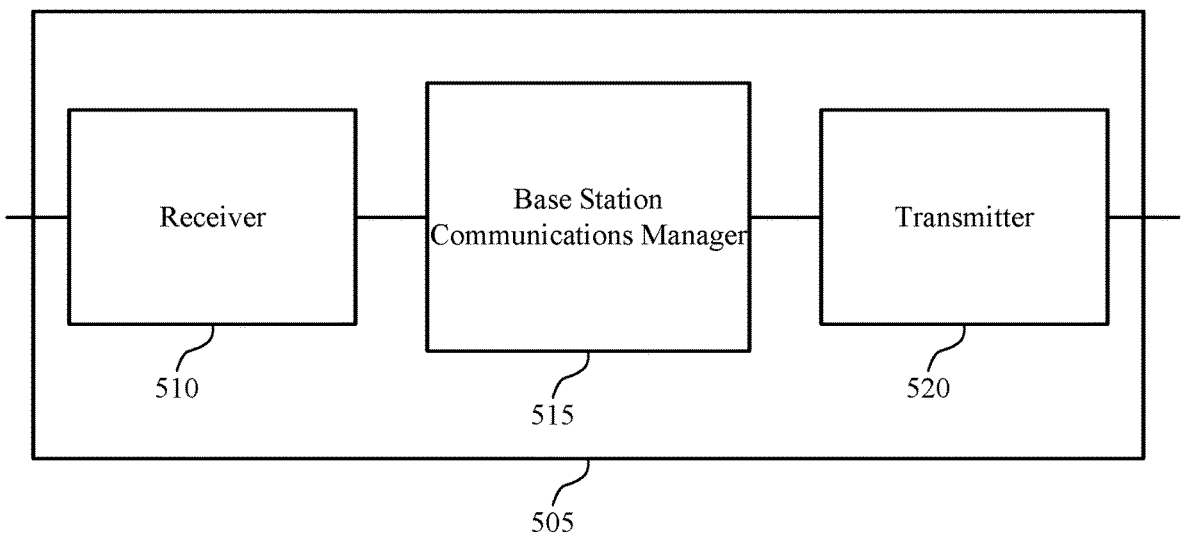
FIGS. 5 through 7 show diagrams of a device that supports cooperative hidden node identification and management in accordance with various aspects of the present disclosure.

FIG. 5 shows a diagram 500 of a wireless device 505 that supports cooperative hidden node identification and management in accordance with various aspects of the present disclosure. Wireless device 505 may be an example of aspects of a base station 105 as described with reference to FIGS. 1-2, and may act as a first transmitting device or a second or neighboring transmitting device. Wireless device 505 may include receiver 510, base station communications manager 515, and transmitter 520. Wireless device 505 may additionally or alternatively include a processor. Each of these components may be in communication with one another (e.g., via one or more buses).

Receiver 510 may receive information such as packets, user data, or control information associated with various information channels (e.g., control channels, data channels, and information related to cooperative hidden node identification and management, etc.). Information may be passed on to other components of the device. The receiver 510 may be an example of aspects of the transceiver 835 described with reference to FIG. 8.

Base station communications manager 515 may be an example of aspects of the base station communications manager 815 described with reference to FIG. 8. Base station communications manager 515 may receive, as a first transmitting device, one or more parameters from a receiving device indicating that the first transmitting device is outside of a transmission observation range of a hidden node and that the receiving device is within the transmission observation range of the hidden node. Base station communications manager 515 may detect, as a first transmitting device, a presence of the hidden node based on the one or more parameters, identify a neighboring transmitting device within the transmission observation range of the hidden node based on the one or more parameters, and coordinate with the neighboring transmitting device to schedule a first transmission from the first transmitting device to the receiving device.

The base station communications manager 515 may additionally or alternatively receive, as a second or neighboring transmitting device, an indication from a first transmitting device that the first transmitting device is outside of a transmission observation range of a hidden node that is causing interference with transmissions from the first transmitting device to a receiving device. The base station communications manager 515 may also, as a second or neighboring transmitting device, identify that the second or neighboring transmitting device is within the transmission observation range of the hidden node, and coordinate with the first transmitting device to schedule a first transmission from the first transmitting device to the receiving device.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
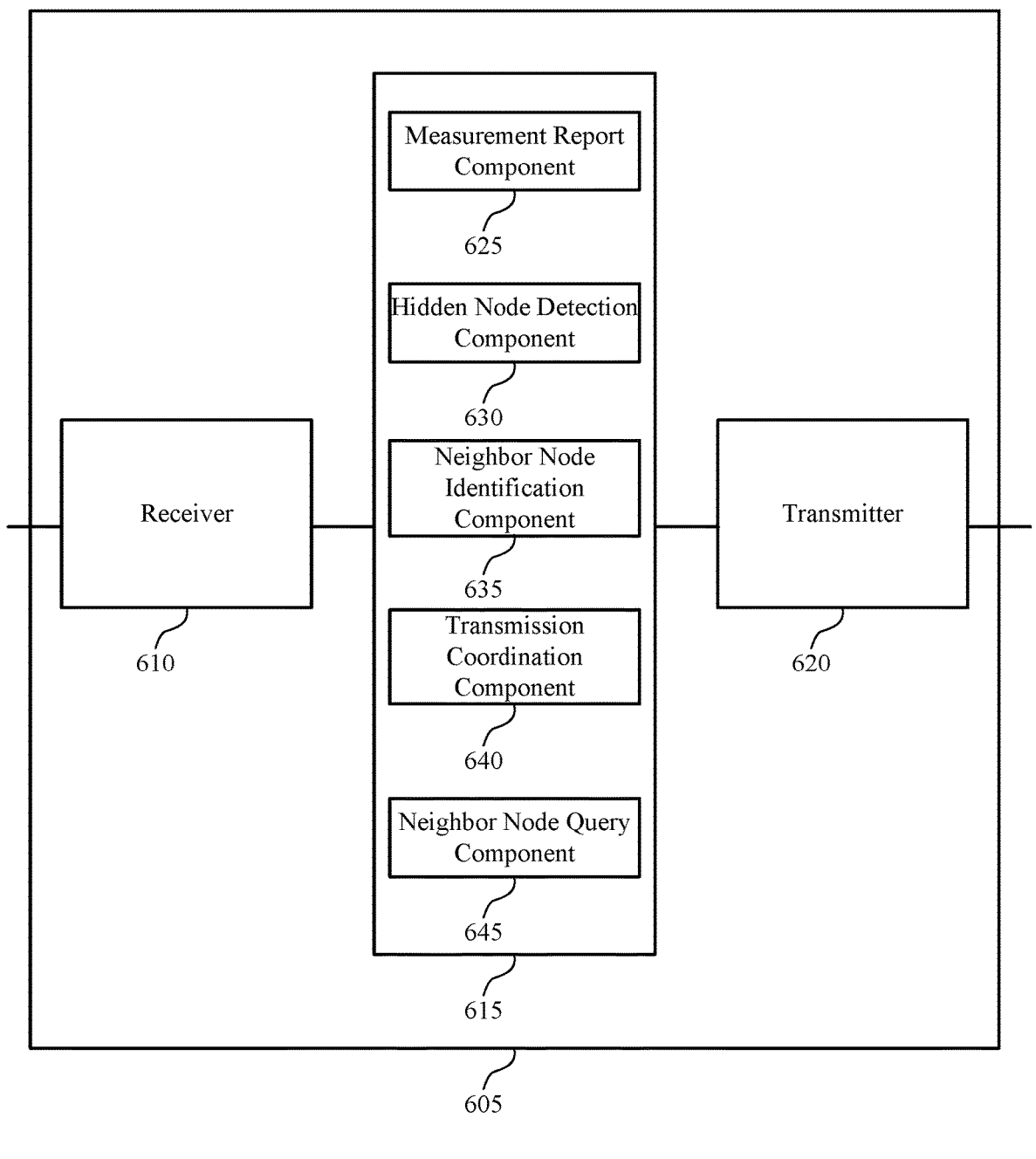

FIG. 6 shows a diagram 600 of a Wireless device 605 that supports cooperative hidden node identification and management in accordance with various aspects of the present disclosure. Wireless device 605 may be an example of aspects of a wireless device 505 or a base station 105 as described with reference to FIGS. 1 and 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to cooperative hidden node identification and management, etc.). Information may be passed on to other components of the device. The receiver 610 may be an example of aspects of the transceiver 835 described with reference to FIG. 8.

Base station communications manager 615 may be an example of aspects of the base station communications manager 815 described with reference to FIG. 8. Base station communications manager 615 may also include measurement report component 625, hidden node detection component 630, neighbor node identification component 635, transmission coordination component 640, and neighbor node query component 645.

Measurement report component 625 may receive, as a first transmitting device, one or more parameters from a receiving device indicating that the first transmitting device is outside of a transmission observation range of a hidden node and that the receiving device is within the transmission observation range of the hidden node and receive one or more parameters associated with the hidden node from the first transmitting device. In some cases, the observation range of the hidden node includes an energy detection range or a preamble detection range of the hidden node. In some cases, the information associated with the one or more parameters includes a time stamp indicating a start time of a transmission of the hidden node. In some cases, the time stamp is determined based on a start time of increased negative acknowledgments or a start time of increased received energy at the receiving device.

Hidden node detection component 630 may detect, as a first transmitting device, a presence of the hidden node based on the one or more parameters, identify the hidden node from the one or more nodes based on the correlating, determine based on the one or more parameters that the receiving device may receive interference from the hidden node, identify that the second transmitting device is within the transmission observation range of the hidden node, determine whether a preamble from the hidden node has been received that indicates the hidden node will transmit during the first transmission, correlate the one or more parameters with receptions from one or more nodes received at the second transmitting device, and determine an identification of the hidden node. In some cases, hidden node identification may be based on a time stamp indicating a start time of a transmission of the hidden node, or a list of potential hidden node identifications. In some cases, the detecting the presence of the hidden node includes confirming an identification of the hidden node.

Neighbor node identification component 635 may identify a neighboring transmitting device within the transmission observation range of the hidden node based on the one or more parameters, provide the identification of the hidden node to the neighboring transmitting device, receive an indication from the neighboring transmitting device that the neighboring transmitting device is within the transmission observation range of the hidden node, provide information associated with the one or more parameters to the neighboring transmitting device, or receive an indication from the neighboring transmitting device that the neighboring transmitting device is within the transmission observation range of the hidden node based on the information associated with the one or more parameters.

In some cases, the neighbor node identification component 635 may respond to the first transmitting device that the hidden node will transmit during the first transmission when the preamble from the hidden node indicates an overlap between a hidden node transmission and the first transmission, and respond to the first transmitting device that the hidden node will not transmit during the first transmission when the preamble from the hidden node is not received or the preamble from the hidden node indicates no overlap between the hidden node transmission and the first transmission. In some cases, the hidden node is identified by the neighboring transmitting device through correlations of the information associated with the one or more parameters and signals received at the neighboring transmitting device from one or more nodes that may be the hidden node. In some cases, the correlation is determined based on multiple comparisons of the information associated with the one or more parameters.

Transmission coordination component 640 may coordinate with a neighboring transmitting device to schedule a first transmission from the first transmitting device to the receiving device, provide the resource allocation to the neighboring transmitting device and an indication that the neighboring transmitting device is to transmit a preamble associated with the resource allocation, coordinate with the first transmitting device to schedule a first transmission from the first transmitting device to the receiving device. In cases where device 605 is a neighboring transmitting device, transmission coordination component 640 may receive a resource allocation for the first transmission from the first transmitting device and coordinate a preamble transmission with the first transmitting device.

Neighbor node query component 645 may, when device 605 is a first transmitting device, query the neighboring transmitting device to determine whether the hidden node will transmit during the first transmission. In cases where device 605 is a neighboring transmitting device, the neighbor node query component 645 may receive an indication from a first transmitting device that the first transmitting device is outside of a transmission observation range of a hidden node that is causing interference with transmissions from the first transmitting device to a receiving device, and receive a query, from the first transmitting device, to determine whether the hidden node will transmit during the first transmission.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
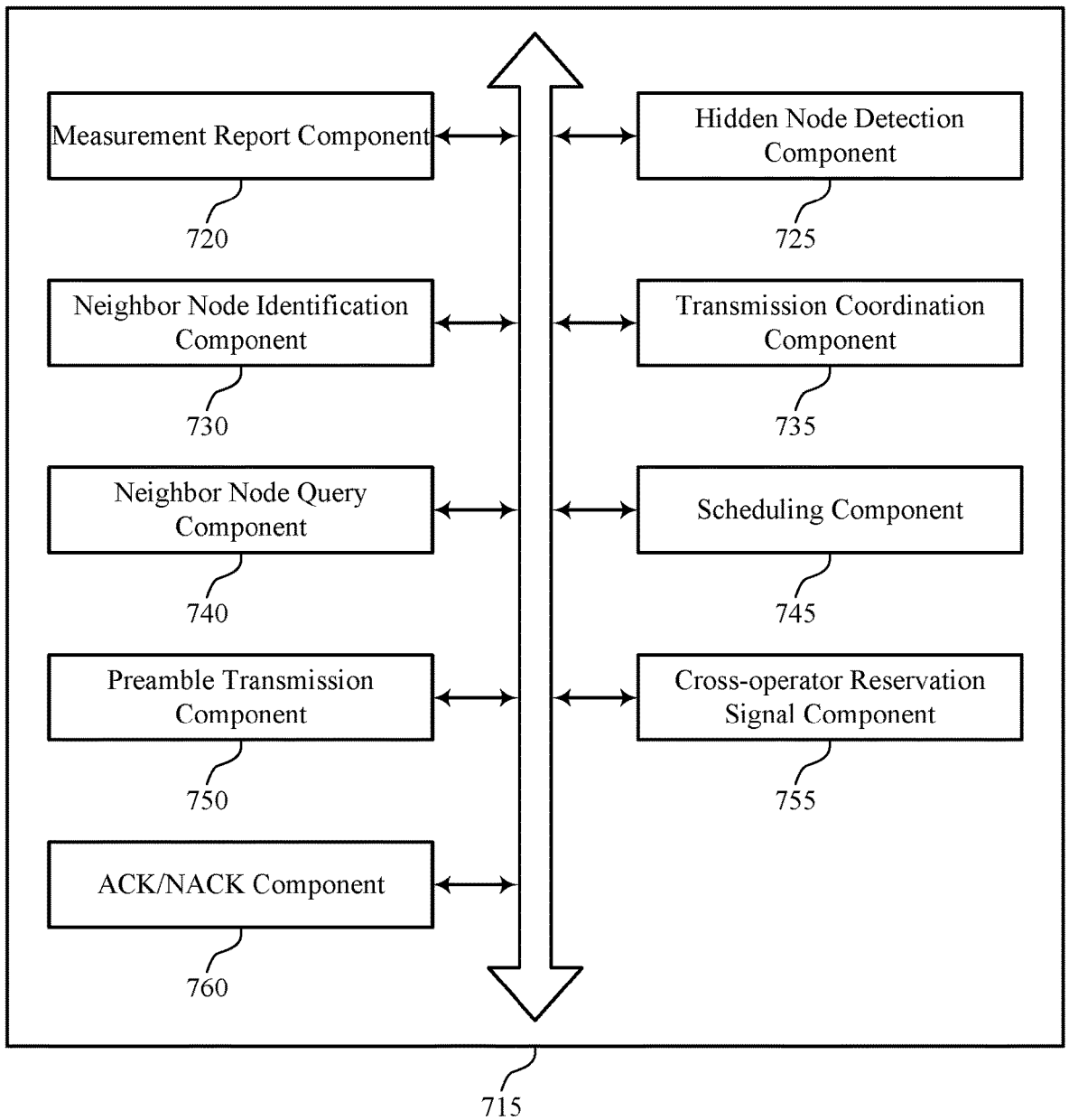

FIG. 7 shows a diagram 700 of a base station communications manager 715 that supports cooperative hidden node identification and management in accordance with various aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include measurement report component 720, hidden node detection component 725, neighbor node identification component 730, transmission coordination component 735, neighbor node query component 740, scheduling component 745, preamble transmission component 750, cross-operator reservation signal component 755, and ACK/NACK component 760. Each of these modules may communicate, directly or indirectly, with one another (e.g., via one or more buses).

Measurement report component 720 may receive, when base station communications manager 715 is part of a first transmitting device, one or more parameters from a receiving device indicating that the first transmitting device is outside of a transmission observation range of a hidden node and that the receiving device is within the transmission observation range of the hidden node and receive one or more parameters associated with the hidden node from the first transmitting device. In some cases, the observation range of the hidden node includes an energy detection range or a preamble detection range of the hidden node. In some cases, information associated with the one or more parameters includes a time stamp indicating a start time of a transmission of the hidden node. In some cases, the time stamp is determined based on a start time of increased negative acknowledgments or a start time of increased received energy at the receiving device.

Hidden node detection component 725 may detect, when base station communications manager 715 is part of a first transmitting device, a presence of the hidden node based on the one or more parameters, determine based on the one or more parameters that the receiving device may receive interference from the hidden node, and determine an identification of the hidden node.

Hidden node detection component 725 may, when base station communications manager 715 is part of a second or neighboring transmitting device, identify the hidden node from the one or more nodes based on correlating measurements with potential hidden node transmissions, identify that the second transmitting device is within the transmission observation range of the hidden node, determine whether a preamble from the hidden node has been received that indicates the hidden node will transmit during the first transmission, correlate the one or more parameters with receptions from one or more nodes received at the second transmitting device, and determine an identification of the hidden node. In some cases, a time stamp indicating a start time of a transmission of the hidden node may be used for identifying a hidden node. In some cases, a list of potential hidden node identifications may be provided by a first receiving device.

Neighbor node identification component 730 may, when base station communications manager 715 is part of a first transmitting device, identify a neighboring transmitting device within the transmission observation range of the hidden node based on the one or more parameters, provide the identification of the hidden node to the neighboring transmitting device, receive an indication from the neighboring transmitting device that the neighboring transmitting device is within the transmission observation range of the hidden node, or provide information associated with the one or more parameters to the neighboring transmitting device.

Neighbor node identification component 730 may, when base station communications manager 715 is part of a second or neighboring transmitting device, respond to a first transmitting device that the hidden node will transmit during the first transmission when the preamble from the hidden node indicates an overlap between a hidden node transmission and the first transmission, and respond to the first transmitting device that the hidden node will not transmit during the first transmission when the preamble from the hidden node is not received or the preamble from the hidden node indicates no overlap between the hidden node transmission and the first transmission. In some cases, the hidden node is identified by the neighboring transmitting device through correlations of the information associated with the one or more parameters and signals received at the neighboring transmitting device from one or more nodes that may be the hidden node. In some cases, the correlation is determined based on multiple comparisons of the information associated with the one or more parameters.

Transmission coordination component 735 may, when base station communications manager 715 is part of a first transmitting device, coordinate with a neighboring transmitting device to schedule a first transmission to the receiving device, provide the resource allocation to the neighboring transmitting device and an indication that the neighboring transmitting device is to transmit a preamble associated with the resource allocation. Transmission coordination component 735 may, when base station communications manager 715 is part of a second or neighboring transmitting device, coordinate with the first transmitting device to schedule a first transmission from the first transmitting device to the receiving device, and receive a resource allocation for the first transmission from the first transmitting device. In some cases, the coordinating with the first transmitting device and the second or neighboring transmitting device includes transmitting a coordinated preamble to prevent the hidden node from transmitting.

Neighbor node query component 740 may, when base station communications manager 715 is part of a first transmitting device, query a neighboring transmitting device to determine whether the hidden node will transmit during the first transmission. Neighbor node query component 740 may, when base station communications manager 715 is part of a second or neighboring transmitting device, receive an indication from a first transmitting device that the first transmitting device is outside of a transmission observation range of a hidden node that is causing interference with transmissions from the first transmitting device to a receiving device, and receive a query, from the first transmitting device, to determine whether the hidden node will transmit during a transmission of the first transmitting device.

Scheduling component 745 may, when base station communications manager 715 is part of a first transmitting device, identify a resource allocation for the first transmission, schedule the first transmission irrespective of the hidden node when the hidden node will not transmit during the first transmission, and account for the hidden node transmission when the hidden node will transmit during the first transmission. In some cases, accounting for the hidden node transmission when the hidden node will transmit during the first transmission includes one or more of selecting an MCS for the first transmission based on the interference from the hidden node, or selecting a wireless channel for the first transmission that is not subject to interference from the hidden node.

Preamble transmission component 750 may, when base station communications manager 715 is part of a first transmitting device, transmit the first transmission using wireless resources identified in the resource allocation and transmit a preamble associated with the resource allocation. In some cases, preamble transmission component 750 may, when base station communications manager 715 is part of a second or neighboring transmitting device, set a transmitter identification that is associated with the second transmitting device and is different than an identification transmitted by the first transmitting device. In some cases, preamble transmission component 750 may, when base station communications manager 715 is part of a second or neighboring transmitting device, set preamble transmitted by the neighboring transmitting as a same preamble that is transmitted by the first transmitting device. The coordinated transmitted preambles may operate to prevent the hidden node from transmitting during the first transmission. In some cases, the preamble indicates a length of the first transmission. In some cases, the preamble includes a RTS transmission that includes a transmitter identification. In some cases, each of the first transmitting device and the neighboring transmitting device uses a same transmitter identification. In some cases, the transmitter identification for each of the first transmitting device and neighboring transmitting device are set to be the first transmitting device transmitter identification. In some cases, the first transmitting device configures the receiving device to disregard the RTS transmission with the second transmitter identification.

Cross-operator reservation signal component 755 may define a cross-operator reservation signal to prevent transmissions from the hidden node during the first transmission. In some cases, the first transmitting device and the neighboring transmitting device are each devices of the same operator, and where the cross-operator reservation signal is ignored by nodes of the same operator.

ACK/NACK component 760 may receive acknowledgment feedback from the receiving device for one or more previous transmissions from the first transmitting device to the receiving device, and detect that an amount of negative acknowledgment feedback exceeds a threshold. In some cases, the threshold is based on one or more of a CSI report from the first receiving device, a RSRP report from the first receiving device, or an MCS used for the one or more previous transmissions.

Figure 8:
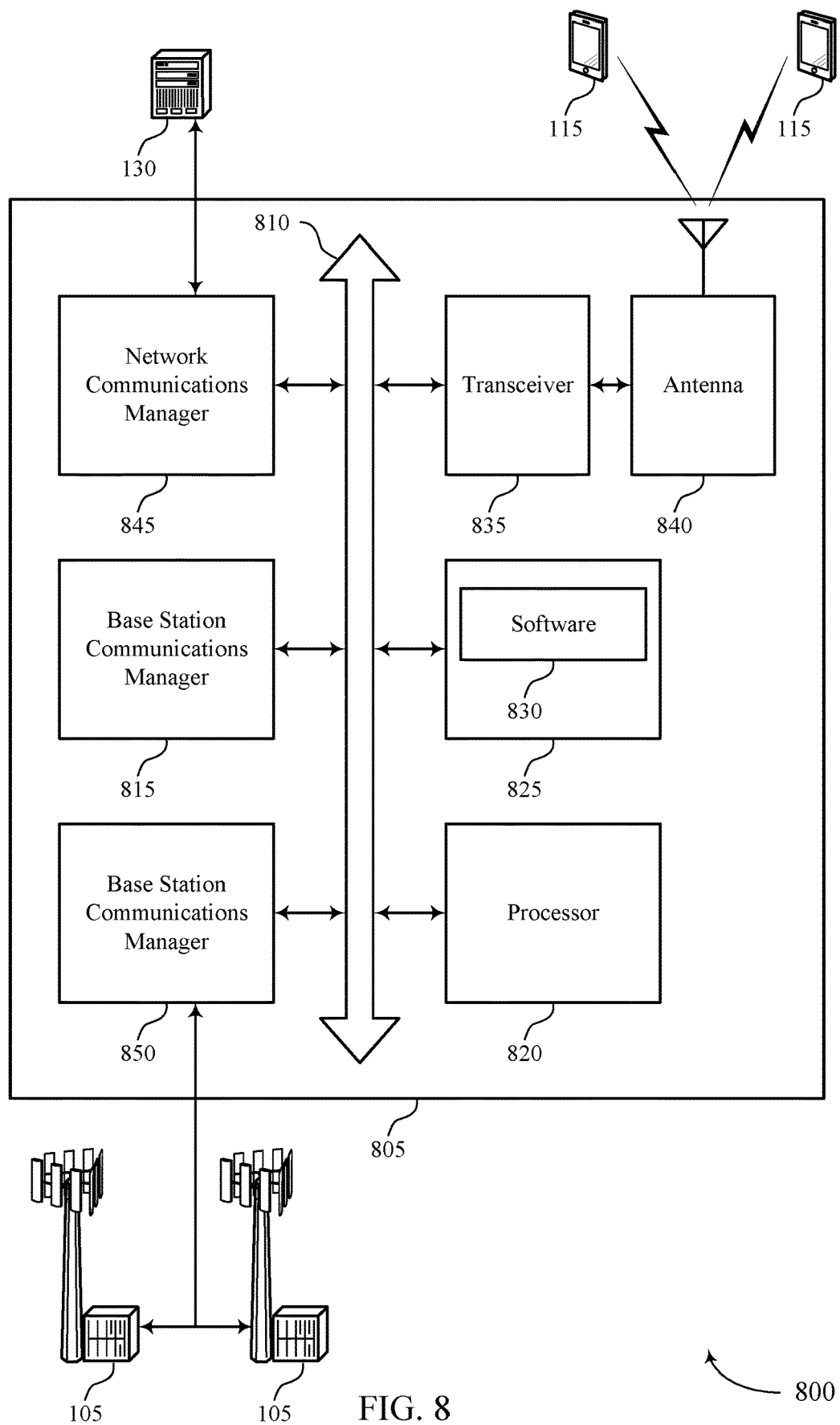
FIG. 8 illustrates a diagram of a system including a base station that supports cooperative hidden node identification and management in accordance with various aspects of the present disclosure.

FIG. 8 shows a diagram of a system 800 including a device 805 that supports cooperative hidden node identification and management in accordance with various aspects of the present disclosure. Device 805 may be an example of or include the components of wireless device 505, wireless device 605, or a base station 105 as described above, e.g., with reference to FIGS. 1 through 6. Device 805 may include components for bi-directional voice and data communications including components for transmitting and receiving communications, including base station communications manager 815, processor 820, memory 825, software 830, transceiver 835, antenna 840, network communications manager 845, and base station communications manager 850.

Base station communications manager 815 may manage communications with other base station 105, and may include a controller or scheduler for controlling communications with UEs 115 in cooperation with other base stations 105. For example, the base station communications manager 815 may coordinate scheduling for transmissions to UEs 115 for various interference mitigation techniques such as beamforming or joint transmission. In some examples, base station communications manager 815 may provide an X2 interface within an LTE/LTE-A wireless communication network technology to provide communication between base stations 105.

Processor 820 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting cooperative hidden node identification and management).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a Basic Input-Output system (BIOS) which may control basic hardware and/or software operation such as the interaction with peripheral components or devices.

Software 830 may include code to implement aspects of the present disclosure, including code to support cooperative hidden node identification and management. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications module 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as joint preamble or RTS transmission. In some examples, base station communications manager 850 may provide an X2 interface within an LTE/LTE-A wireless communication network technology to provide communication between base stations 105.

Figure 9:
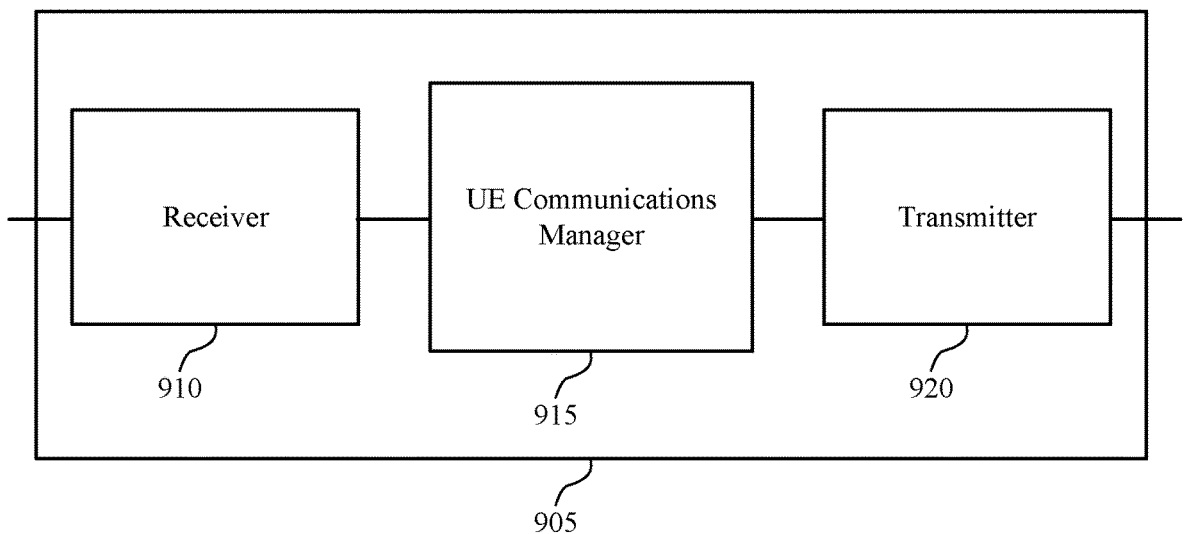
FIGS. 9 through 11 show diagrams of a device that supports cooperative hidden node identification and management in accordance with various aspects of the present disclosure.

FIG. 9 shows a diagram 900 of a wireless device 905 that supports cooperative hidden node identification and management in accordance with various aspects of the present disclosure. Wireless device 905 may be an example of aspects of a UE 115 as described with reference to FIGS. 1-2. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to cooperative hidden node identification and management, etc.). Information may be passed on to other components of the device. The receiver 910 may be an example of aspects of the transceiver 1235 described with reference to FIG. 12.

UE communications manager 915 may be an example of aspects of the UE communications manager 1215 described with reference to FIG. 12. UE communications manager 915 may receive, as a first receiving device, a first transmission from a first transmitting device, receive interference with the first transmission from an interfering transmitting device, identify that the first transmitting device is outside of a transmission observation range of the interfering transmitting device, transmit one or more parameters associated with the interfering transmitting device to the first transmitting device, and receive, from a second transmitting device, a preamble associated with a second transmission from the first transmitting device.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
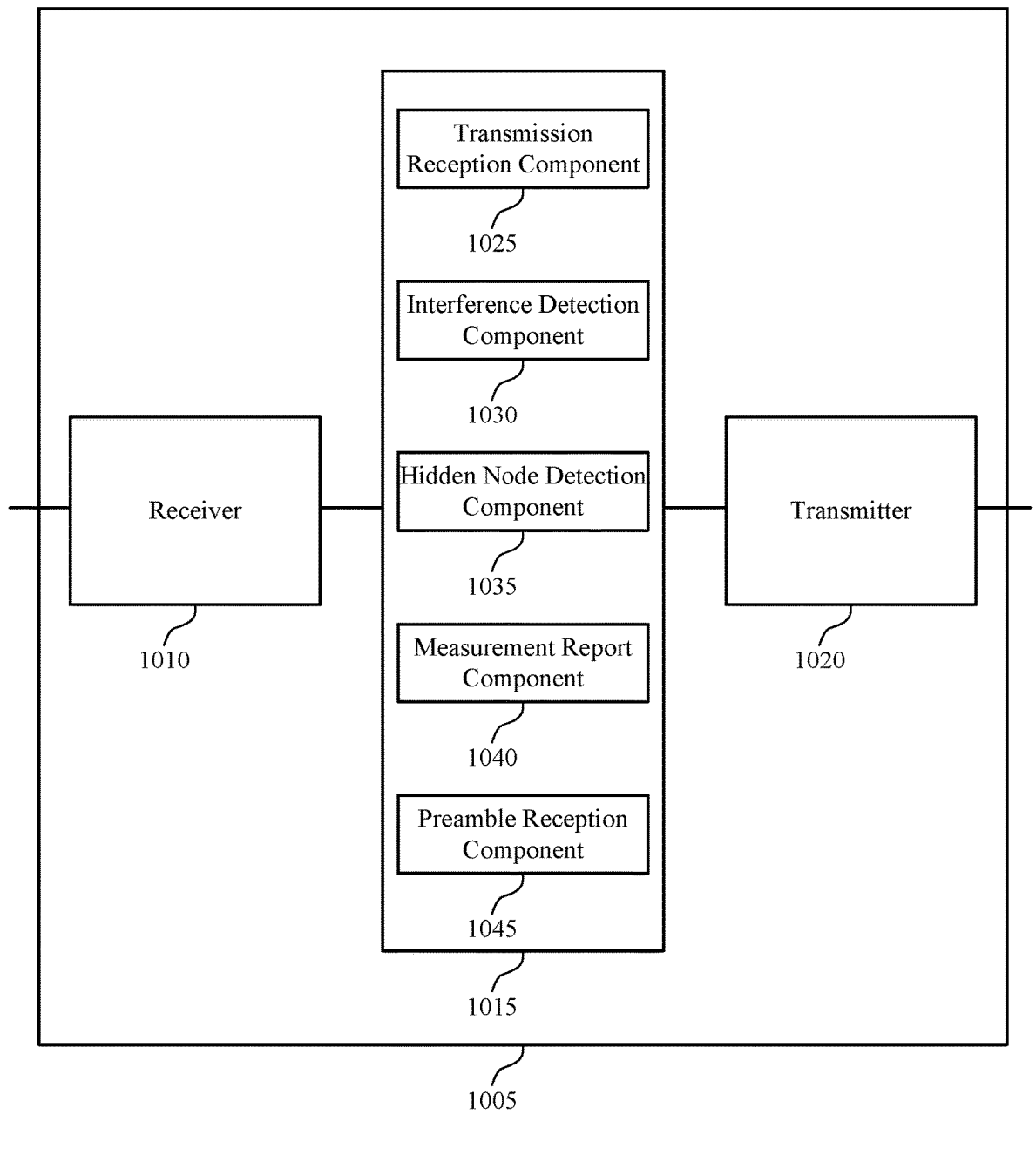

FIG. 10 shows a diagram 1000 of a wireless device 1005 that supports cooperative hidden node identification and management in accordance with various aspects of the present disclosure. Wireless device 1005 may be an example of aspects of a wireless device 905 or a UE 115 as described with reference to FIGS. 1, 2, and 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to cooperative hidden node identification and management, etc.). Information may be passed on to other components of the device. The receiver 1010 may be an example of aspects of the transceiver 1235 described with reference to FIG. 12.

UE communications manager 1015 may be an example of aspects of the UE communications manager 1215 described with reference to FIG. 12. UE communications manager 1015 may also include transmission reception component 1025, interference detection component 1030, hidden node detection component 1035, measurement report component 1040, and preamble reception component 1045.

Transmission reception component 1025 may, in conjunction with receiver 1010, receive a first transmission from a first transmitting device. Interference detection component 1030 may identify, such as discussed above, interference with the first transmission from an interfering transmitting device.

Hidden node detection component 1035 may identify that the first transmitting device is outside of a transmission observation range of the interfering transmitting device. In some cases, the identifying that the first transmitting device is outside of the transmission observation range of the interfering transmitting device includes determining that the interference is received overlapping with a transmission from the first transmitting device.

Measurement report component 1040 may transmit one or more parameters associated with the interfering transmitting device to the first transmitting device and transmit one or more of an identification of the interfering transmitting device, a start time of the interference with the first transmission, or an indication that one or more portions of the first transmission are not successfully received.

Preamble reception component 1045 may receive, from a second transmitting device, a preamble associated with a second transmission from the first transmitting device and ignore the preamble from the second transmitting device. In some cases, the preamble associated with the second transmission is received from both the first transmitting device and the second transmitting device.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
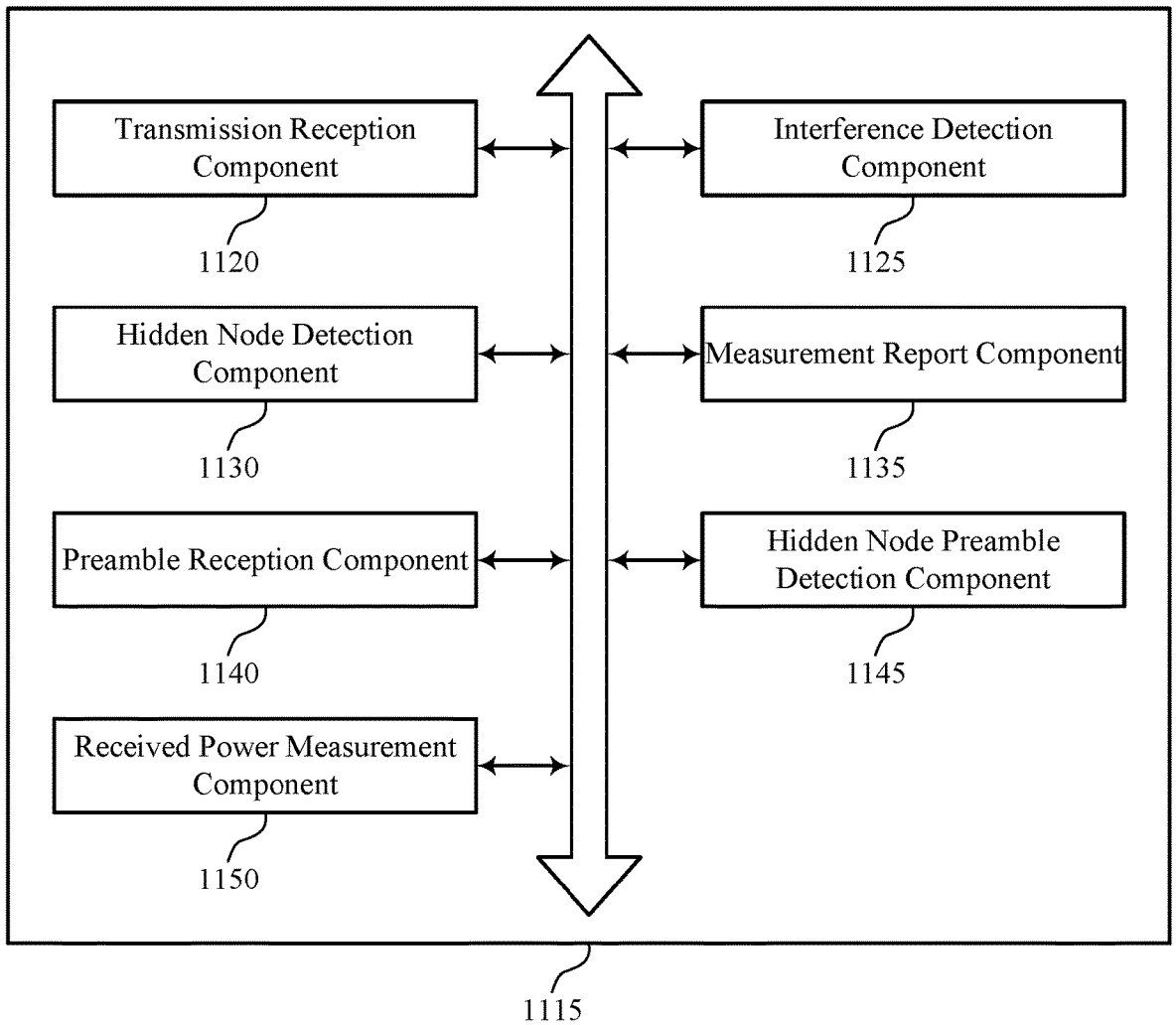

FIG. 11 shows a diagram 1100 of a UE communications manager 1115 that supports cooperative hidden node identification and management in accordance with various aspects of the present disclosure. The UE communications manager 1115 may be an example of aspects of a UE communications manager 1215 described with reference to FIGS. 9, 10, and 12. The UE communications manager 1115 may include transmission reception component 1120, interference detection component 1125, hidden node detection component 1130, measurement report component 1135, preamble reception component 1140, hidden node preamble detection component 1145, and received power measurement component 1150. Each of these modules may communicate, directly or indirectly, with one another (e.g., via one or more buses).

Transmission reception component 1120 may receive a first transmission from a first transmitting device. Interference detection component 1125 may identify interference with the first transmission from an interfering transmitting device. Hidden node detection component 1130 may identify that the first transmitting device is outside of a transmission observation range of the interfering transmitting device.

Measurement report component 1135 may transmit one or more parameters associated with the interfering transmitting device to the first transmitting device and transmit one or more of an identification of the interfering transmitting device, a start time of the interference with the first transmission, or an indication that one or more portions of the first transmission are not successfully received.

Preamble reception component 1140 may receive, from a second transmitting device, a preamble associated with a second transmission from the first transmitting device and ignore the preamble from the second transmitting device. In some cases, the preamble associated with the second transmission is received from both the first transmitting device and the second transmitting device.

Hidden node preamble detection component 1145 may detect a preamble associated with the interference from the interfering transmitting device and determine that a transmission duration identified in the preamble overlaps resources allocated for the first transmission.

Received power measurement component 1150 may detect an increase in received power from the interfering transmitting device before or during the first transmission. In some cases, the one or more parameters associated with the interfering transmitting device include a start time of the increase in received power.

Figure 12:
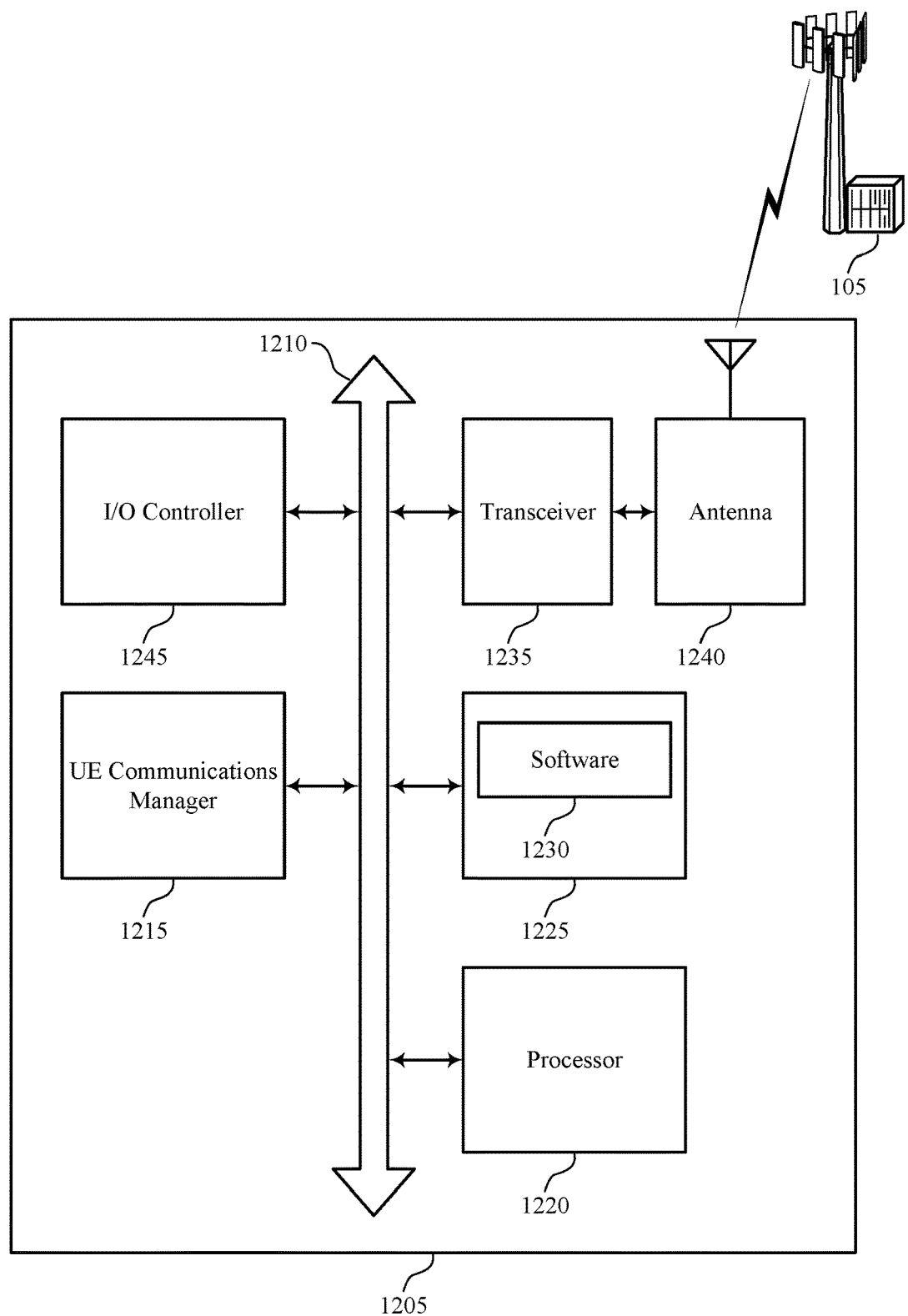
FIG. 12 illustrates a diagram of a system including a UE that supports cooperative hidden node identification and management in accordance with various aspects of the present disclosure.

FIG. 12 shows a diagram of a system 1200 including a device 1205 that supports cooperative hidden node identification and management in accordance with various aspects of the present disclosure. Device 1205 may be an example of or include the components of UE 115 as described above, e.g., with reference to FIGS. 1-4. Device 1205 may include components for bi-directional voice and data communications including components for transmitting and receiving communications, including UE communications manager 1215, processor 1220, memory 1225, software 1230, transceiver 1235, antenna 1240, and I/O controller 1245.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting cooperative hidden node identification and management).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support cooperative hidden node identification and management. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. Input/output control component 1245 may also manage peripherals not integrated into device 1205. In some cases, input/output control component 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
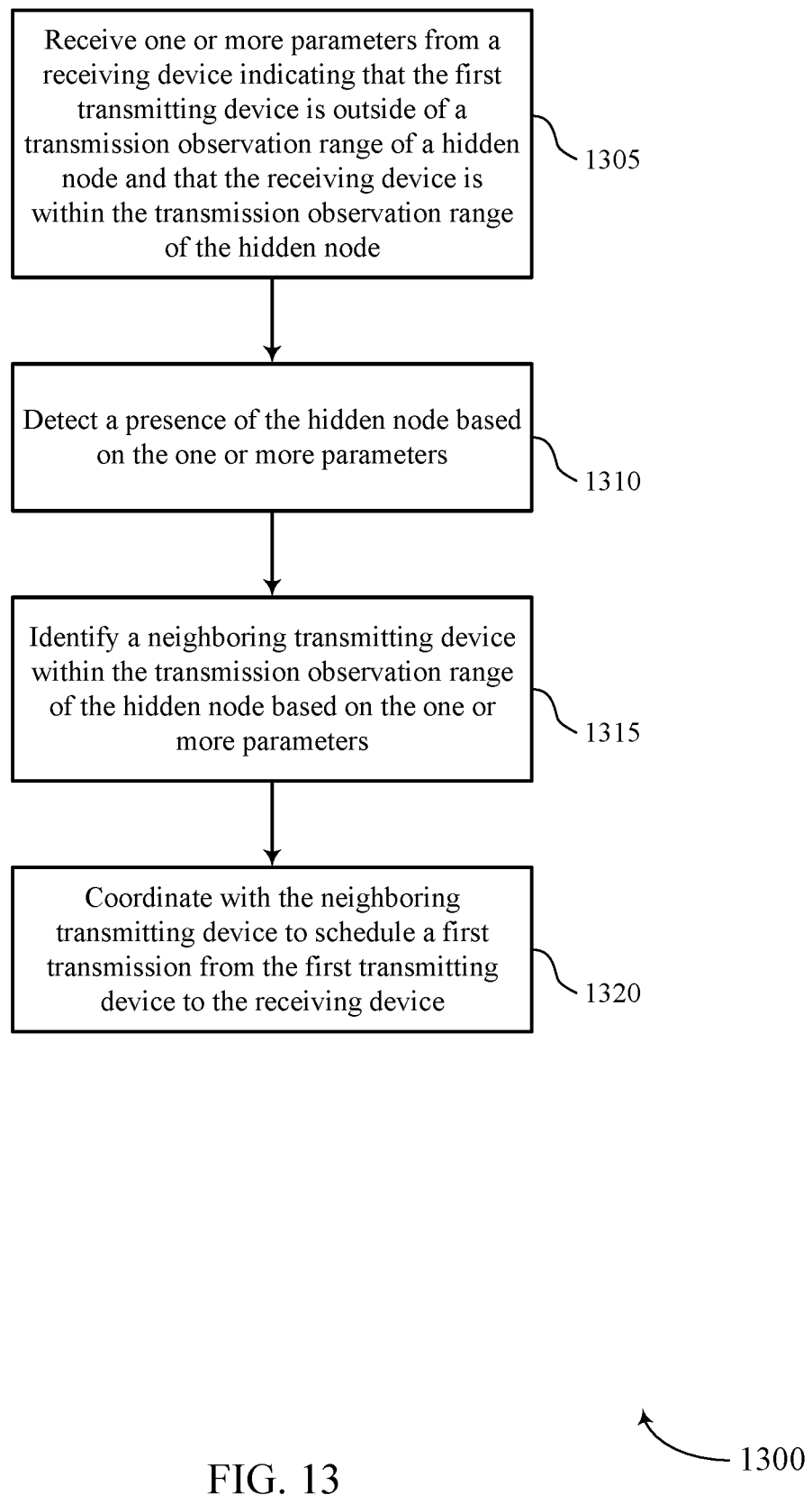
FIGS. 13 through 21 illustrate methods for cooperative hidden node identification and management in accordance with various aspects of the present disclosure.

FIG. 13 shows a flowchart illustrating a method 1300 for cooperative hidden node identification and management in accordance with various aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1305 the base station 105 may receive one or more parameters from a receiving device indicating that the first transmitting device is outside of a transmission observation range of a hidden node and that the receiving device is within the transmission observation range of the hidden node. The operations of block 1305 may be performed according to the methods described with reference to FIGS. 1 through 4. In some examples, aspects of the operations of block 1305 may be performed by a measurement report component as described with reference to FIGS. 5 through 8.

At block 1310 the base station 105 may detect a presence of the hidden node based on the one or more parameters. The operations of block 1310 may be performed according to the methods described with reference to FIGS. 1 through 4. In some examples, aspects of the operations of block 1310 may be performed by a hidden node detection component as described with reference to FIGS. 5 through 8.

At block 1315 the base station 105 may identify a neighboring transmitting device within the transmission observation range of the hidden node based on the one or more parameters. The operations of block 1315 may be performed according to the methods described with reference to FIGS. 1 through 4. In some examples, aspects of the operations of block 1315 may be performed by a neighbor node identification component as described with reference to FIGS. 5 through 8.

At block 1320 the base station 105 may coordinate with the neighboring transmitting device to schedule a first transmission from the first transmitting device to the receiving device. The operations of block 1320 may be performed according to the methods described with reference to FIGS. 1 through 4. In some examples, aspects of the operations of block 1320 may be performed by a transmission coordination component as described with reference to FIGS. 5 through 8.

Figure 14:
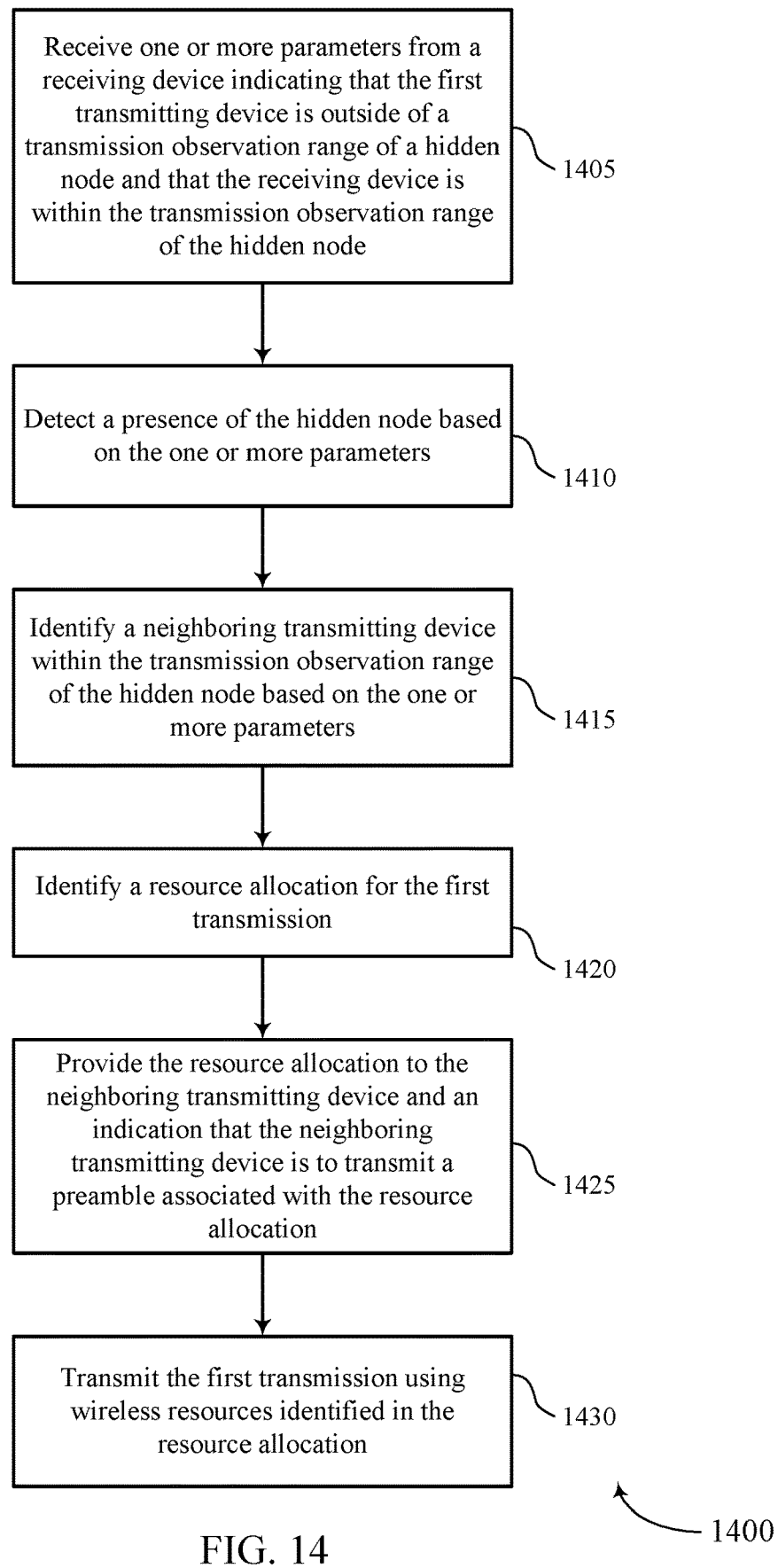

FIG. 14 shows a flowchart illustrating a method 1400 for cooperative hidden node identification and management in accordance with various aspects of the present disclosure. The operations of method 1400 may be implemented by a base station 105 or its components as described herein. For example, the operations of method 1400 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1405 the base station 105 may receive, at a first transmitting device, one or more parameters from a receiving device indicating that the first transmitting device is outside of a transmission observation range of a hidden node and that the receiving device is within the transmission observation range of the hidden node. The operations of block 1405 may be performed according to the methods described with reference to FIGS. 1, 2, and 4. In some examples, aspects of the operations of block 1405 may be performed by a measurement report component as described with reference to FIGS. 5 through 8.

At block 1410 the base station 105 may detect, at the first transmitting device, a presence of the hidden node based on the one or more parameters. The operations of block 1410 may be performed according to the methods described with reference to FIGS. 1, 2, and 4. In some examples, aspects of the operations of block 1410 may be performed by a hidden node detection component as described with reference to FIGS. 5 through 8.

At block 1415 the base station 105 may identify a neighboring transmitting device within the transmission observation range of the hidden node based on the one or more parameters. The operations of block 1415 may be performed according to the methods described with reference to FIGS. 1, 2, and 4. In some examples, aspects of the operations of block 1415 may be performed by a neighbor node identification component as described with reference to FIGS. 5 through 8.

At block 1420 the base station 105 may identify a resource allocation for the first transmission. The operations of block 1420 may be performed according to the methods described with reference to FIGS. 1, 2, and 4. In some examples, aspects of the operations of block 1420 may be performed by a scheduling component as described with reference to FIGS. 5 through 8.

At block 1425 the base station 105 may provide the resource allocation to the neighboring transmitting device and an indication that the neighboring transmitting device is to transmit a preamble associated with the resource allocation. The operations of block 1425 may be performed according to the methods described with reference to FIGS. 1, 2, and 4. In some examples, aspects of the operations of block 1425 may be performed by a transmission coordination component as described with reference to FIGS. 5 through 8.

At block 1430 the base station 105 may transmit the first transmission using wireless resources identified in the resource allocation. The operations of block 1430 may be performed according to the methods described with reference to FIGS. 1, 2, and 4. In some examples, aspects of the operations of block 1430 may be performed by a preamble transmission component as described with reference to FIGS. 5 through 8.

Figure 15:
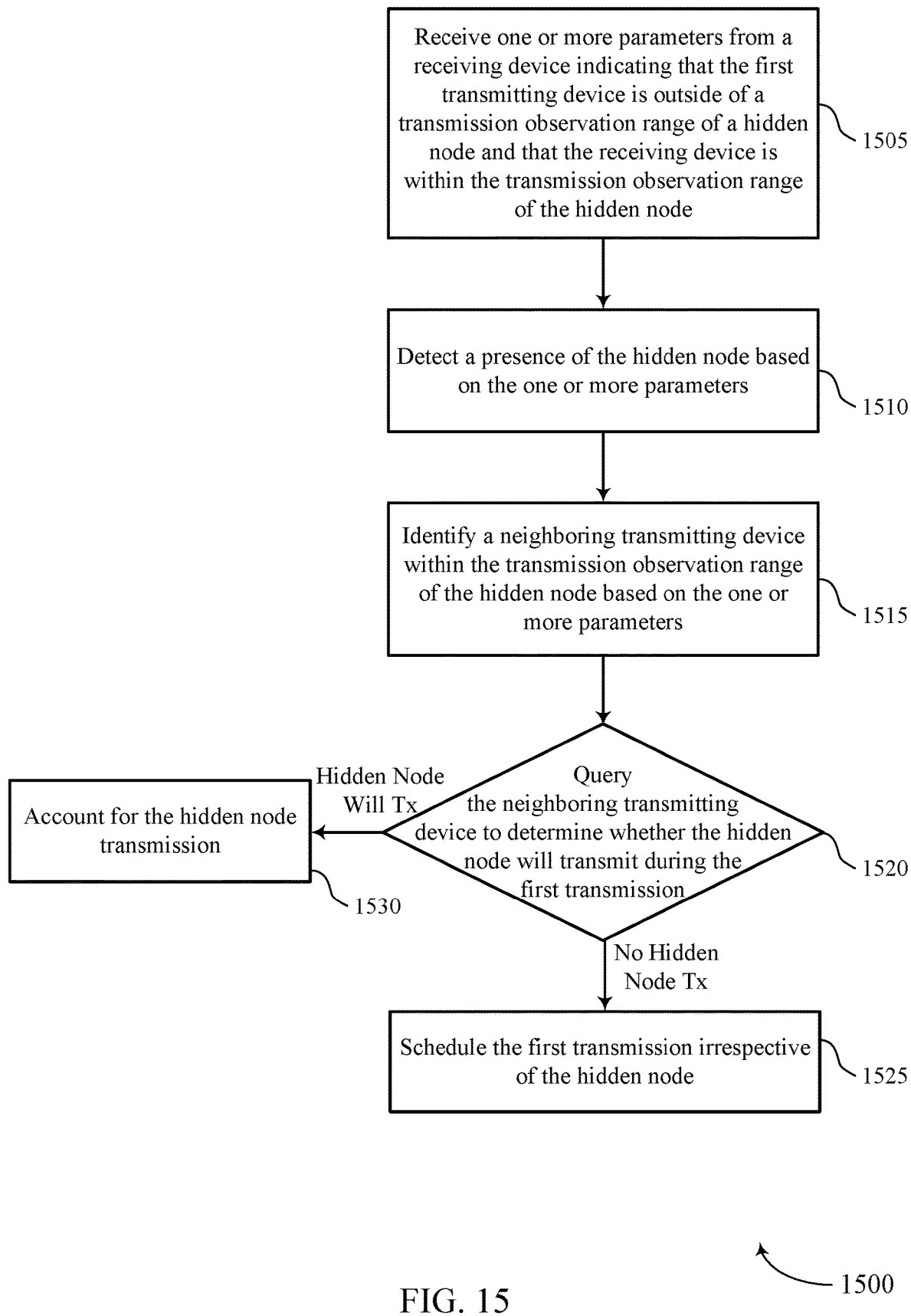

FIG. 15 shows a flowchart illustrating a method 1500 for cooperative hidden node identification and management in accordance with various aspects of the present disclosure. The operations of method 1500 may be implemented by a base station 105 or its components as described herein. For example, the operations of method 1500 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1505 the base station 105 may receive one or more parameters from a receiving device indicating that the first transmitting device is outside of a transmission observation range of a hidden node and that the receiving device is within the transmission observation range of the hidden node. The operations of block 1505 may be performed according to the methods described with reference to FIGS. 1 through 3. In some examples, aspects of the operations of block 1505 may be performed by a measurement report component as described with reference to FIGS. 5 through 8.

At block 1510 the base station 105 may detect a presence of the hidden node based on the one or more parameters. The operations of block 1510 may be performed according to the methods described with reference to FIGS. 1 through 3. In some examples, aspects of the operations of block 1510 may be performed by a hidden node detection component as described with reference to FIGS. 5 through 8.

At block 1515 the base station 105 may identify a neighboring transmitting device within the transmission observation range of the hidden node based on the one or more parameters. The operations of block 1515 may be performed according to the methods described with reference to FIGS. 1 through 3. In some examples, aspects of the operations of block 1515 may be performed by a neighbor node identification component as described with reference to FIGS. 5 through 8.

At block 1520 the base station 105 may query the neighboring transmitting device to determine whether the hidden node will transmit during the first transmission. The operations of block 1520 may be performed according to the methods described with reference to FIGS. 1 through 3. In some examples, aspects of the operations of block 1520 may be performed by a neighbor node query component as described with reference to FIGS. 5 through 8.

At block 1525 the base station 105 may schedule the first transmission irrespective of the hidden node when the hidden node will not transmit during the first transmission. The operations of block 1525 may be performed according to the methods described with reference to FIGS. 1 through 3. In some examples, aspects of the operations of block 1525 may be performed by a scheduling component as described with reference to FIGS. 5 through 8.

At block 1530 the base station 105 may account for the hidden node transmission when the hidden node will transmit during the first transmission. The operations of block 1530 may be performed according to the methods described with reference to FIGS. 1 through 3. In some examples, aspects of the operations of block 1530 may be performed by a scheduling component as described with reference to FIGS. 5 through 8.

Figure 16:
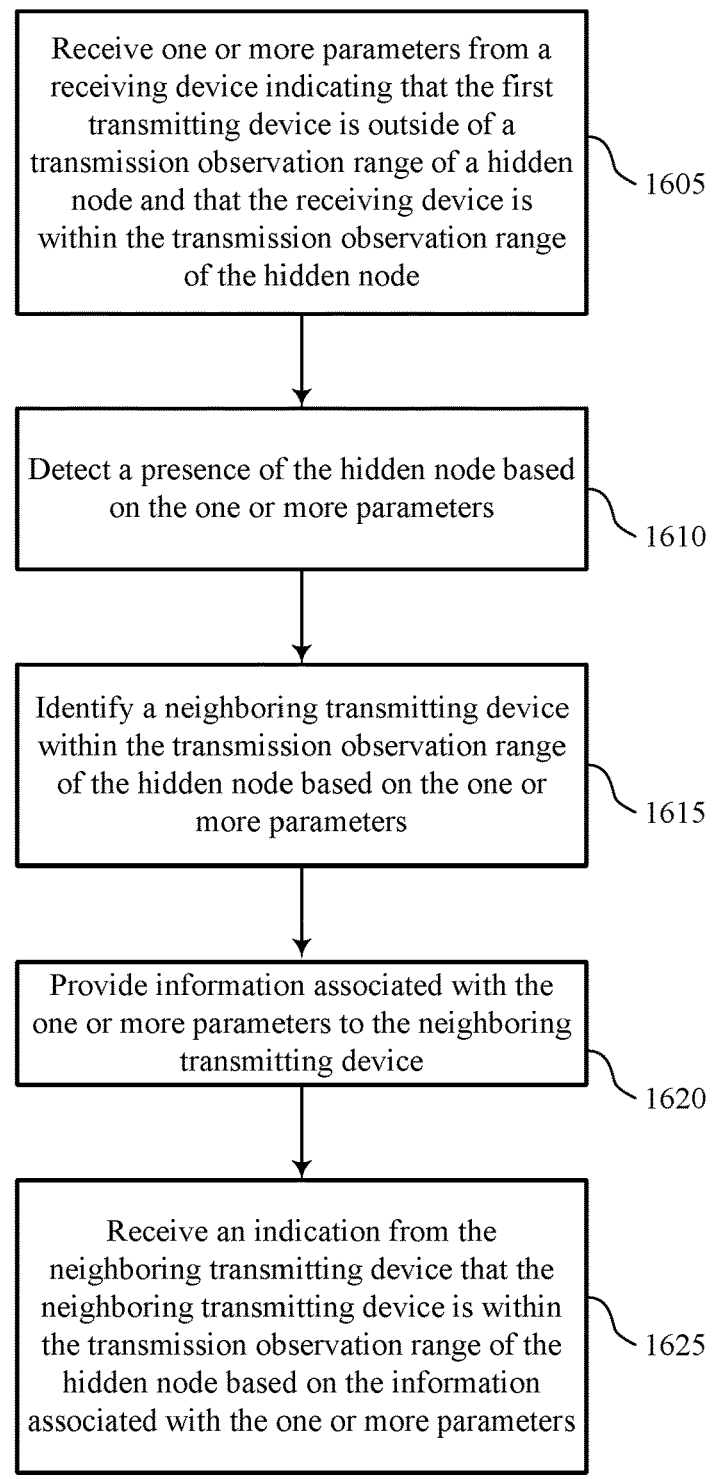

FIG. 16 shows a flowchart illustrating a method 1600 for cooperative hidden node identification and management in accordance with various aspects of the present disclosure. The operations of method 1600 may be implemented by a base station 105 or its components as described herein. For example, the operations of method 1600 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may receive one or more parameters from a receiving device indicating that the first transmitting device is outside of a transmission observation range of a hidden node and that the receiving device is within the transmission observation range of the hidden node. The operations of block 1605 may be performed according to the methods described with reference to FIGS. 1 through 4. In some examples, aspects of the operations of block 1605 may be performed by a measurement report component as described with reference to FIGS. 5 through 8.

At block 1610 the base station 105 may detect a presence of the hidden node based on the one or more parameters. The operations of block 1610 may be performed according to the methods described with reference to FIGS. 1 through 4. In some examples, aspects of the operations of block 1610 may be performed by a hidden node detection component as described with reference to FIGS. 5 through 8.

At block 1615 the base station 105 may identify a neighboring transmitting device within the transmission observation range of the hidden node based on the one or more parameters. The operations of block 1615 may be performed according to the methods described with reference to FIGS. 1 through 4. In some examples, aspects of the operations of block 1615 may be performed by a neighbor node identification component as described with reference to FIGS. 5 through 8.

At block 1620 the base station 105 may provide information associated with the one or more parameters to the neighboring transmitting device. The operations of block 1620 may be performed according to the methods described with reference to FIGS. 1 through 4. In some examples, aspects of the operations of block 1620 may be performed by a neighbor node identification component as described with reference to FIGS. 5 through 8.

At block 1625 the base station 105 may receive an indication from the neighboring transmitting device that the neighboring transmitting device is within the transmission observation range of the hidden node based on the information associated with the one or more parameters. The operations of block 1625 may be performed according to the methods described with reference to FIGS. 1 through 4. In some examples, aspects of the operations of block 1625 may be performed by a neighbor node identification component as described with reference to FIGS. 5 through 8. In some examples, the information associated with the one or more parameters includes a time stamp indicating a start time of a transmission of the hidden node. In some cases, the hidden node is identified by the neighboring transmitting device through one or more correlations of the information associated with the one or more parameters and signals received at the neighboring transmitting device from one or more nodes that may be the hidden node.

Figure 17:
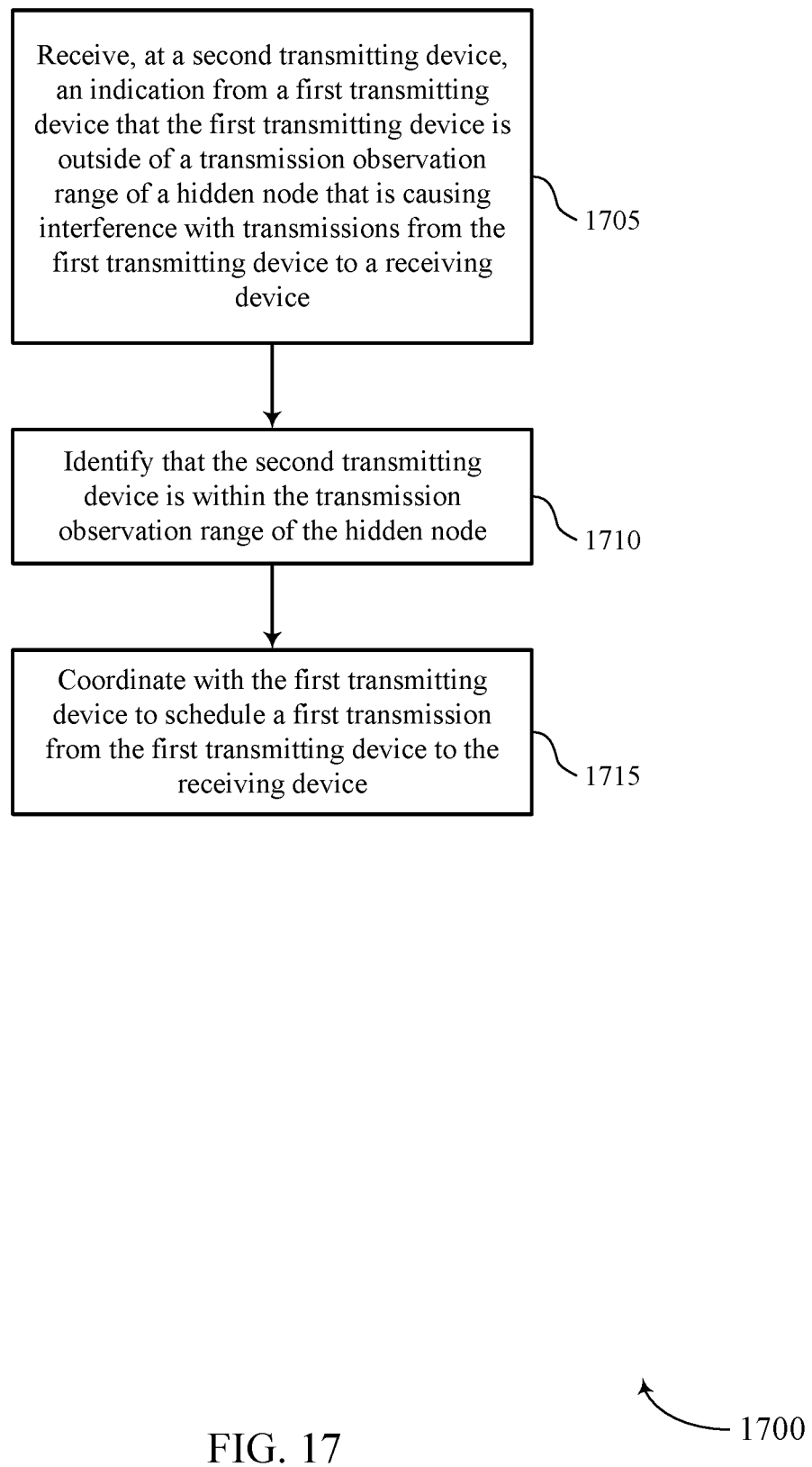

FIG. 17 shows a flowchart illustrating a method 1700 for cooperative hidden node identification and management in accordance with various aspects of the present disclosure. The operations of method 1700 may be implemented by a base station 105 or its components as described herein. For example, the operations of method 1700 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may receive, as a second or neighboring transmitting device, an indication from a first transmitting device that the first transmitting device is outside of a transmission observation range of a hidden node that is causing interference with transmissions from the first transmitting device to a receiving device. The operations of block 1705 may be performed according to the methods described with reference to FIGS. 1 through 4. In some examples, aspects of the operations of block 1705 may be performed by a neighbor node query component as described with reference to FIGS. 5 through 8.

At block 1710 the base station 105 may identify that the second or neighboring transmitting device is within the transmission observation range of the hidden node. The operations of block 1710 may be performed according to the methods described with reference to FIGS. 1 through 4. In some examples, aspects of the operations of block 1710 may be performed by a hidden node detection component as described with reference to FIGS. 5 through 8.

At block 1715 the base station 105 may coordinate with the first transmitting device to schedule a first transmission from the first transmitting device to the receiving device. The operations of block 1715 may be performed according to the methods described with reference to FIGS. 1 through 4. In some examples, aspects of the operations of block 1715 may be performed by a transmission coordination component as described with reference to FIGS. 5 through 8.

Figure 18:
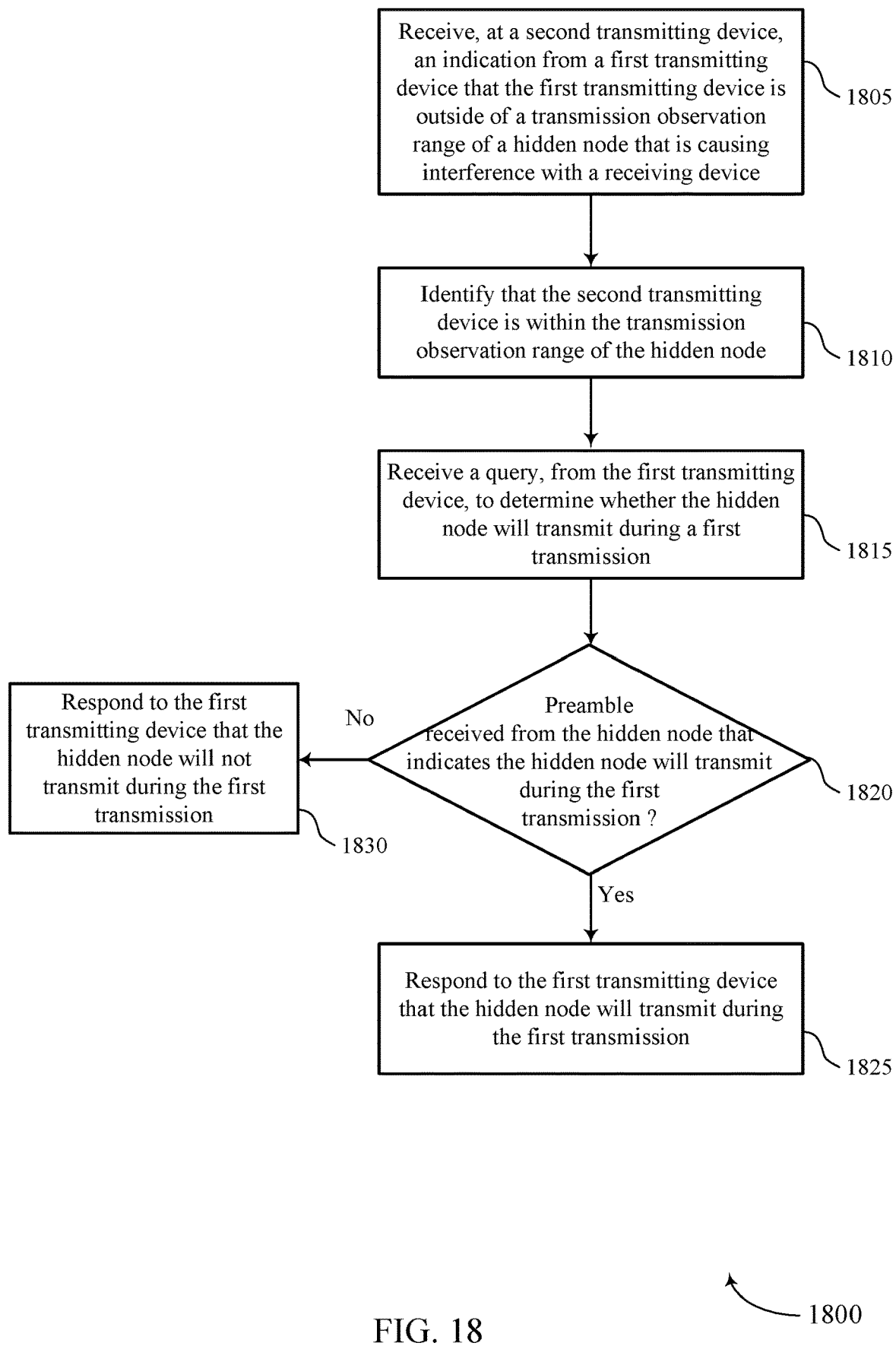

FIG. 18 shows a flowchart illustrating a method 1800 for cooperative hidden node identification and management in accordance with various aspects of the present disclosure. The operations of method 1800 may be implemented by a base station 105 or its components as described herein. For example, the operations of method 1800 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1805 the base station 105 may receive, as a second or neighboring transmitting device, an indication from a first transmitting device that the first transmitting device is outside of a transmission observation range of a hidden node that is causing interference with transmissions from the first transmitting device to a receiving device. The operations of block 1805 may be performed according to the methods described with reference to FIGS. 1, 2, and 4. In some examples, aspects of the operations of block 1805 may be performed by a neighbor node query component as described with reference to FIGS. 5 through 8.

At block 1810 the base station 105 may identify that the second transmitting device is within the transmission observation range of the hidden node. The operations of block 1810 may be performed according to the methods described with reference to FIGS. 1, 2, and 4. In some examples, aspects of the operations of block 1810 may be performed by a hidden node detection component as described with reference to FIGS. 5 through 8.

At block 1815 the base station 105 may receive a query, from the first transmitting device, to determine whether the hidden node will transmit during the first transmission. The operations of block 1815 may be performed according to the methods described with reference to FIGS. 1, 2, and 4. In some examples, aspects of the operations of block 1815 may be performed by a neighbor node query component as described with reference to FIGS. 5 through 8.

At block 1820 the base station 105 may determine whether a preamble from the hidden node indicates the hidden node will transmit during the first transmission. The operations of block 1820 may be performed according to the methods described with reference to FIGS. 1, 2, and 4. In some examples, aspects of the operations of block 1820 may be performed by a hidden node detection component as described with reference to FIGS. 5 through 8.

At block 1825 the base station 105 may respond to the first transmitting device that the hidden node will transmit during the first transmission when the preamble from the hidden node indicates an overlap between a hidden node transmission and the first transmission. The operations of block 1825 may be performed according to the methods described with reference to FIGS. 1, 2, and 4. In some examples, aspects of the operations of block 1825 may be performed by a neighbor node identification component as described with reference to FIGS. 5 through 8.

At block 1830 the base station 105 may respond to the first transmitting device that the hidden node will not transmit during the first transmission when the preamble from the hidden node is not received or the preamble from the hidden node indicates no overlap between the hidden node transmission and the first transmission. The operations of block 1830 may be performed according to the methods described with reference to FIGS. 1, 2, and 4. In some examples, aspects of the operations of block 1830 may be performed by a neighbor node identification component as described with reference to FIGS. 5 through 8.

Figure 19:
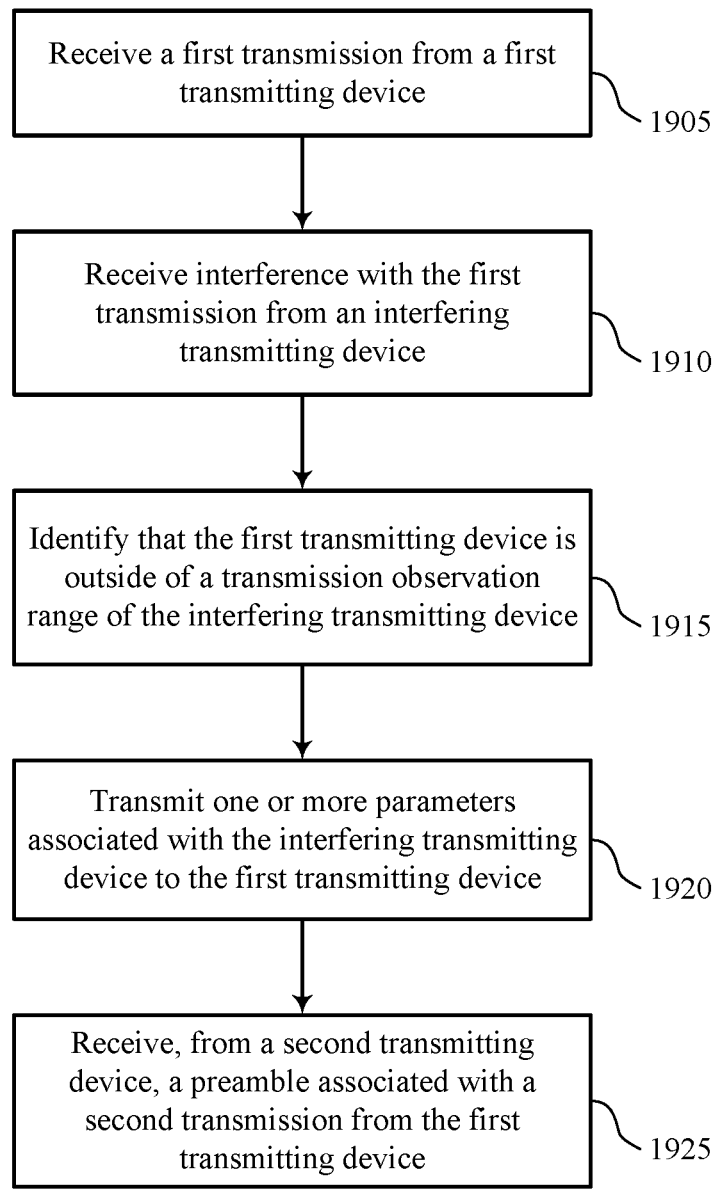

FIG. 19 shows a flowchart illustrating a method 1900 for cooperative hidden node identification and management in accordance with various aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may receive a first transmission from a first transmitting device. The operations of block 1905 may be performed according to the methods described with reference to FIGS. 1 through 4. In some examples, aspects of the operations of block 1905 may be performed by a transmission reception component as described with reference to FIGS. 9 through 12.

At block 1910 the UE 115 may receive interference with the first transmission from an interfering transmitting device. The operations of block 1910 may be performed according to the methods described with reference to FIGS. 1 through 4. In some examples, aspects of the operations of block 1910 may be performed by an interference detection component as described with reference to FIGS. 9 through 12.

At block 1915 the UE 115 may identify that the first transmitting device is outside of a transmission observation range of the interfering transmitting device. The operations of block 1915 may be performed according to the methods described with reference to FIGS. 1 through 4. In some examples, aspects of the operations of block 1915 may be performed by a hidden node detection component as described with reference to FIGS. 9 through 12.

At block 1920 the UE 115 may transmit one or more parameters associated with the interfering transmitting device to the first transmitting device. The operations of block 1920 may be performed according to the methods described with reference to FIGS. 1 through 4. In some examples, aspects of the operations of block 1920 may be performed by a measurement report component as described with reference to FIGS. 9 through 12.

At block 1925 the UE 115 may receive, from a second transmitting device, a preamble associated with a second transmission from the first transmitting device. The operations of block 1925 may be performed according to the methods described with reference to FIGS. 1 through 4. In some examples, aspects of the operations of block 1925 may be performed by a preamble reception component as described with reference to FIGS. 9 through 12.

Figure 20:
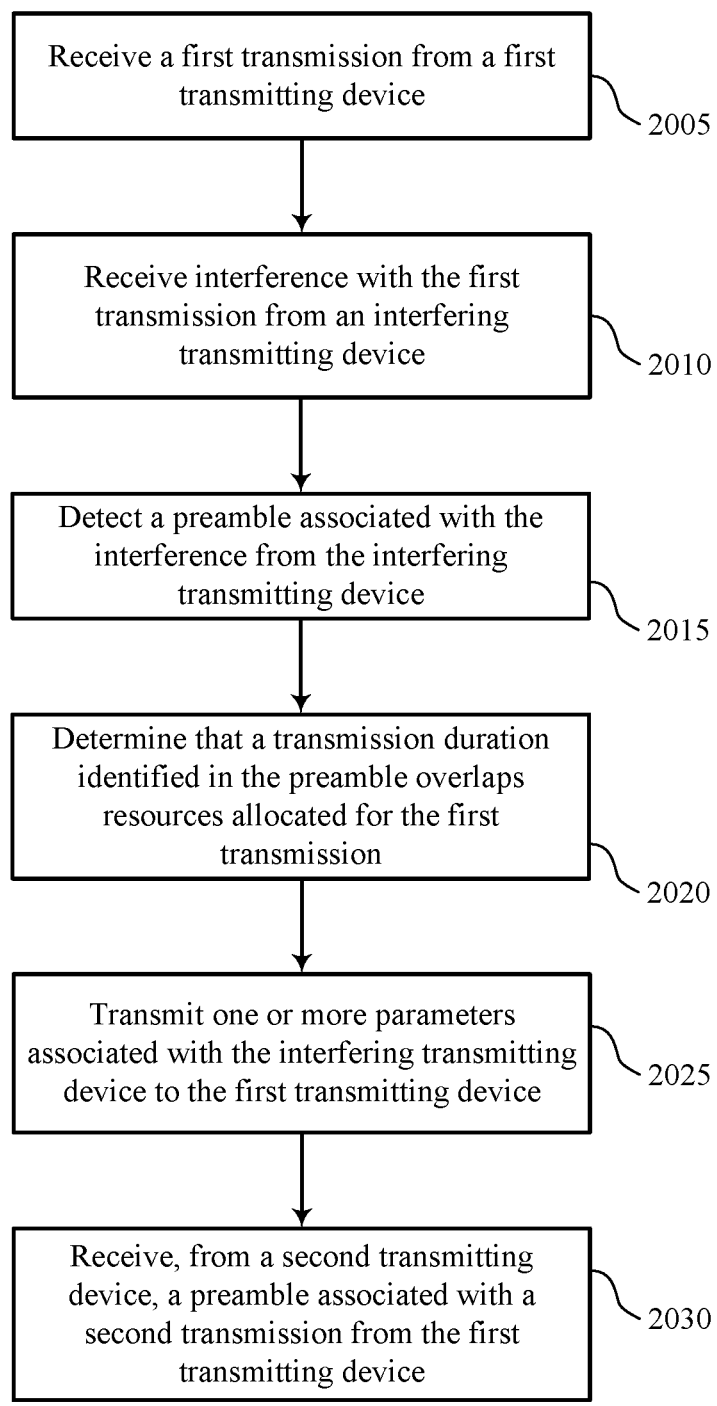

FIG. 20 shows a flowchart illustrating a method 2000 for cooperative hidden node identification and management in accordance with various aspects of the present disclosure. The operations of method 2000 may be implemented by a UE 115 or its components as described herein. For example, the operations of method 2000 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 2005 the UE 115 may receive a first transmission from a first transmitting device. The operations of block 2005 may be performed according to the methods described with reference to FIGS. 1 through 4. In some examples, aspects of the operations of block 2005 may be performed by a transmission reception component as described with reference to FIGS. 9 through 12.

At block 2010 the UE 115 may receive interference with the first transmission from an interfering transmitting device. The operations of block 2010 may be performed according to the methods described with reference to FIGS.

1 through 4. In some examples, aspects of the operations of block 2010 may be performed by an interference detection component as described with reference to FIGS. 9 through 12.

At block 2015 the UE 115 may detect a preamble associated with the interference from the interfering transmitting device. The operations of block 2015 may be performed according to the methods described with reference to FIGS. 1 through 4. In some examples, aspects of the operations of block 2015 may be performed by a hidden node preamble detection component as described with reference to FIGS. 9 through 12.

At block 2020 the UE 115 may determine that a transmission duration identified in the preamble overlaps resources allocated for the first transmission. The operations of block 2020 may be performed according to the methods described with reference to FIGS. 1 through 4. In some examples, aspects of the operations of block 2020 may be performed by a hidden node preamble detection component as described with reference to FIGS. 9 through 12.

At block 2025 the UE 115 may transmit one or more parameters associated with the interfering transmitting device to the first transmitting device. The operations of block 2025 may be performed according to the methods described with reference to FIGS. 1 through 4. In some examples, aspects of the operations of block 2025 may be performed by a measurement report component as described with reference to FIGS. 9 through 12.

At block 2030 the UE 115 may receive, from a second transmitting device, a preamble associated with a second transmission from the first transmitting device. The operations of block 2030 may be performed according to the methods described with reference to FIGS. 1 through 4. In some examples, aspects of the operations of block 2030 may be performed by a preamble reception component as described with reference to FIGS. 9 through 12.

Figure 21:
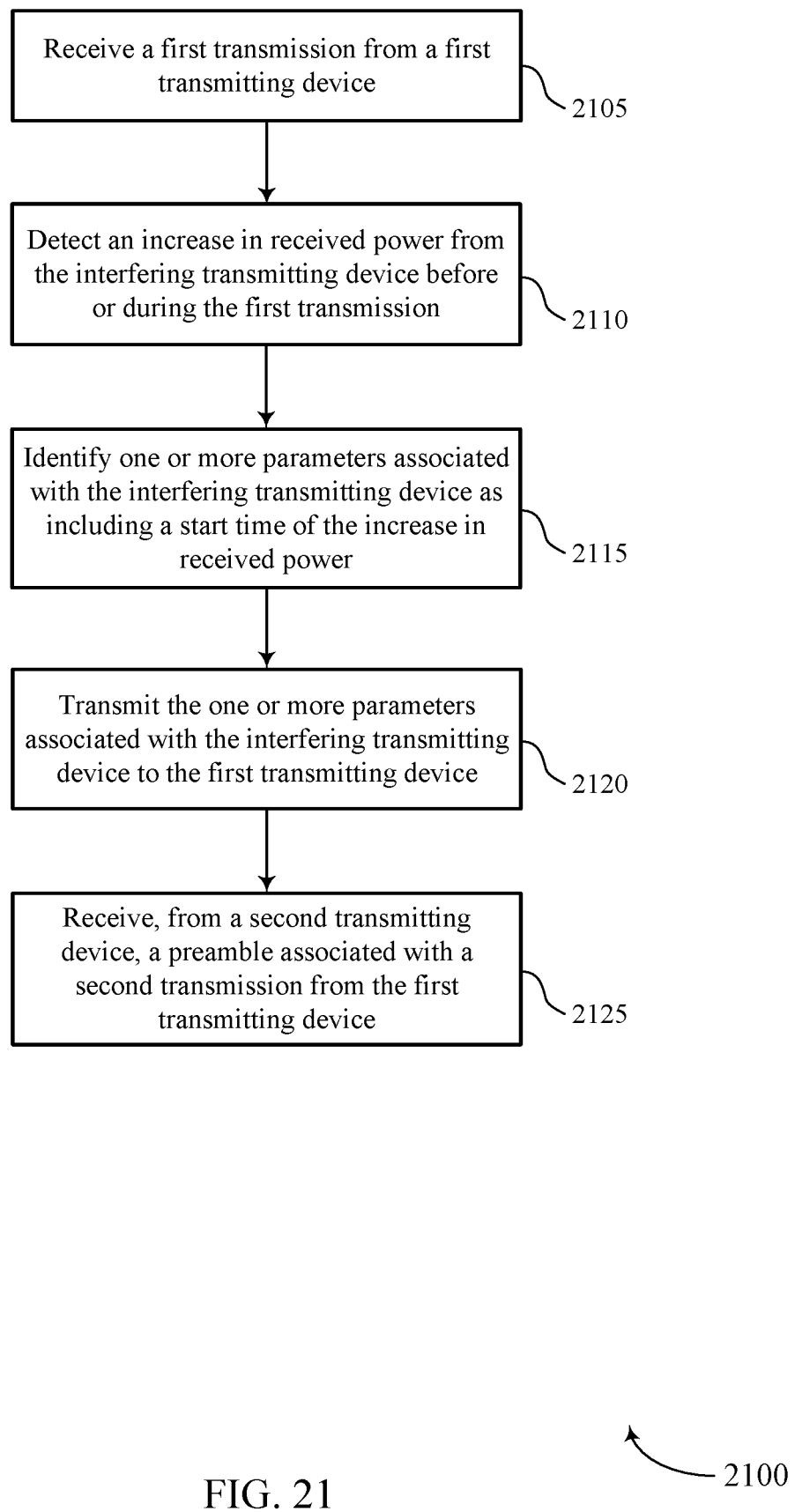

FIG. 21 shows a flowchart illustrating a method 2100 for cooperative hidden node identification and management in accordance with various aspects of the present disclosure. The operations of method 2100 may be implemented by a UE 115 or its components as described herein. For example, the operations of method 2100 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 2105 the UE 115 may receive a first transmission from a first transmitting device. The operations of block 2105 may be performed according to the methods described with reference to FIGS. 1 through 4. In some examples, aspects of the operations of block 2105 may be performed by a transmission reception component as described with reference to FIGS. 9 through 12.

At block 2110 the UE 115 may detect an increase in received power from the interfering transmitting device before or during the first transmission. The operations of block 2110 may be performed according to the methods described with reference to FIGS. 1 through 4. In some examples, aspects of the operations of block 2110 may be performed by a received power measurement component as described with reference to FIGS. 9 through 12.

At block 2115 the UE 115 may identify one or more parameters associated with the interfering transmitting device as including a start time of the increase in received power. The operations of block 2115 may be performed according to the methods described with reference to FIGS. 1 through 4. In some examples, aspects of the operations of block 2115 may be performed by a received power measurement component as described with reference to FIGS. 9 through 12.

At block 2120 the UE 115 may transmit the one or more parameters associated with the interfering transmitting device to the first transmitting device. The operations of block 2120 may be performed according to the methods described with reference to FIGS. 1 through 4. In some examples, aspects of the operations of block 2120 may be performed by a measurement report component as described with reference to FIGS. 9 through 12.

At block 2125 the UE 115 may receive, from a second transmitting device, a preamble associated with a second transmission from the first transmitting device. The operations of block 2125 may be performed according to the methods described with reference to FIGS. 1 through 4. In some examples, aspects of the operations of block 2125 may be performed by a preamble reception component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The present disclosure describes various techniques with reference to or that may be applied in next generation networks (e.g., 5G or NR networks) that are being designed to support distinct features such as high bandwidth operations. While aspects an LTE system may be described for purposes of example, and LTE terminology may be used in much of the description, the techniques described herein are applicable beyond LTE applications, including in 5G or NR applications, among others.

In LTE/LTE-A networks, including such networks described herein, the term eNB may for example be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a first transmitting device, one or more parameters from a receiving device indicating that the first transmitting device is outside of a transmission observation range of a hidden node and that the receiving device is within the transmission observation range of the hidden node;
   detecting, at the first transmitting device, a presence of the hidden node based at least in part on the one or more parameters;
   identifying, at the first transmitting device, a neighboring transmitting device within the transmission observation range of the hidden node based at least in part on the one or more parameters; and
   coordinating with the neighboring transmitting device, by the first transmitting device, to schedule a first transmission from the first transmitting device to the receiving device.

2. The method of claim 1, wherein the coordinating with the neighboring transmitting device to schedule the first transmission from the first transmitting device to the receiving device comprises:
   identifying, by the first transmitting device, a resource allocation for the first transmission;
   providing, by the first transmitting device, the resource allocation to the neighboring transmitting device and an indication that the neighboring transmitting device is to transmit a preamble associated with the resource allocation; and
   transmitting, from the first transmitting device, the first transmission using wireless resources identified in the resource allocation.

3. The method of claim 2, wherein,
   the neighboring transmitting device and the first transmitting device each transmit a same preamble associated with the resource allocation and the preamble transmitted by the neighboring transmitting device operates to prevent the hidden node from transmitting during the first transmission.

4. The method of claim 2, wherein,
   the preamble comprises a ready to send (RTS) transmission that includes a transmitter identification.

5. The method of claim 4, wherein,
   the first transmitting device and the neighboring transmitting device use a same transmitter identification.

6. The method of claim 5, wherein the first transmitting device transmits a first transmitter identification, the neighboring transmitting device transmits a second transmitter identification; and
   wherein the first transmitting device configures the receiving device to disregard the RTS transmission with the second transmitter identification.

7. The method of claim 1, wherein the coordinating with the neighboring transmitting device to schedule the first transmission from the first transmitting device to the receiving device comprises:
   defining a cross-operator reservation signal to prevent transmissions from the hidden node during the first transmission;
   indicating, by the first transmitting device, to the neighboring transmitting device when the cross-operator reservation signal is to be transmitted; and
   transmitting, by the first transmitting device, the cross-operator reservation signal and the first transmission, wherein the first transmitting device and the neighboring transmitting device are each devices of the same operator, and wherein the cross-operator reservation signal is ignored by devices of the same operator.

8. The method of claim 1, wherein the coordinating with the neighboring transmitting device to schedule the first transmission from the first transmitting device to the receiving device comprises:
   querying, by the first transmitting device, the neighboring transmitting device to determine whether the hidden node will transmit during the first transmission;
   scheduling, by the first transmitting device, the first transmission irrespective of transmissions of the hidden node when the hidden node will not transmit during the first transmission; and
   accounting, by the first transmitting device, for a transmission from the hidden node when it is determined that the hidden node will transmit during the first transmission based on a result of the querying.

9. The method of claim 8, wherein the accounting for the transmission from the hidden node comprises one or more of:

selecting, by the first transmitting device, a modulation and coding scheme (MCS) for the first transmission based at least in part on interference from the hidden node, or selecting, by the first transmitting device, a wireless channel for the first transmission that is not subject to interference from the hidden node.

10. The method of claim 1, wherein the receiving the one or more parameters by the first transmitting device comprises receiving one or more of:

an identification of the hidden node;
a time stamp indicating a start time of a transmission of the hidden node; or
a list of identifications of potential hidden nodes; and
wherein the detecting the presence of the hidden node comprises:
determining based at least in part on the one or more parameters that the receiving device may receive interference from the hidden node.

11. The method of claim 1, wherein,
the receiving the one or more parameters comprises receiving acknowledgment feedback from the receiving device for one or more previous transmissions from the first transmitting to the receiving device, and
wherein the detecting the presence of the hidden node comprises detecting that an amount of negative acknowledgment feedback exceeds a threshold.

12. The method of claim 1, wherein the identifying the neighboring transmitting device within the transmission observation range of the hidden node by the first transmitting device comprises:
determining an identification of the hidden node;
providing the identification of the hidden node to the neighboring transmitting device; and
receiving an indication from the neighboring transmitting device that the neighboring transmitting device is within the transmission observation range of the hidden node.

13. The method of claim 1, wherein the identifying the neighboring transmitting device within the transmission observation range of the hidden node by the first transmitting device comprises:
providing, by the first transmitting device, information associated with the one or more parameters to the neighboring transmitting device; and
receiving, by the first transmitting device, an indication from the neighboring transmitting device that the neighboring transmitting device is within the transmission observation range of the hidden node based at least in part on the information associated with the one or more parameters.

14. A method for wireless communication, comprising:
receiving, at a second transmitting device, an indication from a first transmitting device that the first transmitting device is outside of a transmission observation range of a hidden node that is causing interference with transmissions from the first transmitting device to a receiving device;
identifying, by the second transmitting device, that the second transmitting device is within the transmission observation range of the hidden node; and
coordinating with the first transmitting device, by the second transmitting device, to schedule a first transmission from the first transmitting device to the receiving device.

15. The method of claim 14, wherein the coordinating with the first transmitting device comprises:

receiving, by the second transmitting device, a resource allocation for the first transmission from the first transmitting device; and
transmitting, by the second transmitting device, a preamble associated with the resource allocation.

16. The method of claim 15, wherein the preamble is a same preamble that is transmitted by the first transmitting device.

17. The method of claim 15, wherein the preamble comprises a ready to send (RTS) transmission that includes a transmitter identification, and wherein the transmitter identification is associated with the second transmitting device and is different than an identification transmitted by the first transmitting device.

18. The method of claim 14, wherein the coordinating with the first transmitting device comprises:
receiving a query, from the first transmitting device, to determine whether the hidden node will transmit during the first transmission;
determining, by the second transmitting device, whether a preamble from the hidden node has been received that indicates the hidden node will transmit during the first transmission;
responding to the first transmitting device that the hidden node will transmit during the first transmission when the preamble from the hidden node indicates an overlap between a hidden node transmission and the first transmission; and
responding to the first transmitting device that the hidden node will not transmit during the first transmission when the preamble from the hidden node is not received or the preamble from the hidden node indicates no overlap between the hidden node transmission and the first transmission.

19. The method of claim 14, wherein the identifying that the second transmitting device is within the transmission observation range of the hidden node comprises:
receiving, by the second transmitting device, one or more parameters associated with the hidden node from the first transmitting device;
correlating, by the second transmitting device, the one or more parameters with receptions from one or more nodes received at the second transmitting device; and
identifying, by the second transmitting device, the hidden node from the one or more nodes based at least in part on the correlating.

20. A method for wireless communication, comprising:
receiving, at a first receiving device, a first transmission from a first transmitting device;
receiving, at the first receiving device, interference with the first transmission from an interfering transmitting device;
identifying, by the first receiving device, that the first transmitting device is outside of a transmission observation range of the interfering transmitting device, wherein the identifying comprises:
detecting a preamble associated with the interference from the interfering transmitting device, and
determining that a transmission duration of the preamble associated with the interference from the interfering transmitting device overlaps resources allocated for the first transmission;
transmitting, by the first receiving device, one or more parameters associated with the interfering transmitting device to the first transmitting device; and receiving, from a second transmitting device, a preamble associated with a second transmission from the first transmitting device.

21. The method of claim 20, wherein the preamble associated with the second transmission is received by the first receiving device from both the first transmitting device and the second transmitting device.

22. The method of claim 21, further comprising:
ignoring the preamble from the second transmitting device.

23. The method of claim 20, wherein the transmitting the one or more parameters associated with the interfering transmitting device comprises:
transmitting, by the first receiving device, one or more of an identification of the interfering transmitting device, a start time of the interference with the first transmission, or an indication that one or more portions of the first transmission are not successfully received.

24. An apparatus for wireless communication, in a system comprising:
a processor;
a memory in electronic communication with the processor; and
instructions stored in the memory and executable by the processor to cause the apparatus to:
receive one or more parameters from a receiving device indicating that the apparatus is outside of a transmission observation range of a hidden node and that the receiving device is within the transmission observation range of the hidden node;
detect a presence of the hidden node based at least in part on the one or more parameters;
identify a neighboring transmitting device within the transmission observation range of the hidden node based at least in part on the one or more parameters; and
coordinate with the neighboring transmitting device to schedule a first transmission from the apparatus to the receiving device.

25. The apparatus of claim 24, wherein the instructions further cause the apparatus to:
identify a resource allocation for the first transmission;
provide the resource allocation to the neighboring transmitting device and an indication that the neighboring transmitting device is to transmit a preamble associated with the resource allocation; and
transmit the first transmission using wireless resources identified in the resource allocation.

26. The apparatus of claim 25, wherein,
the neighboring transmitting device and the apparatus each transmit a same preamble associated with the resource allocation and the preamble transmitted by the neighboring transmitting device operates to prevent the hidden node from transmitting during the first transmission.

27. The apparatus of claim 25, wherein,
the preamble comprises a ready to send (RTS) transmission that includes a transmitter identification.

28. The apparatus of claim 27, wherein,
the apparatus and the neighboring transmitting device use a same transmitter identification.

29. A method for wireless communication, comprising:
receiving, at a first receiving device, a first transmission from a first transmitting device;
receiving, at the first receiving device, interference with the first transmission from an interfering transmitting device;
identifying, by the first receiving device, that the first transmitting device is outside of a transmission observation range of the interfering transmitting device, wherein the identifying comprises detecting an increase in received power from the interfering transmitting device before or during the first transmission,
transmitting, by the first receiving device, one or more parameters associated with the interfering transmitting device to the first transmitting device, wherein the one or more parameters comprise a start time of the increase in received power; and
receiving, from a second transmitting device, a preamble associated with a second transmission from the first transmitting device.

* * * * *